(12) United States Patent
Hwang

(10) Patent No.: US 12,538,246 B2
(45) Date of Patent: Jan. 27, 2026

(54) METHOD FOR SYNCHRONIZATION BETWEEN UEs ACCORDING TO CHANGE IN REFERENCE SYNCHRONIZATION SOURCE IN V2X COMMUNICATION SYSTEM, AND DEVICE THEREFOR

(71) Applicant: LG ELECTRONICS INC., Seoul (KR)

(72) Inventor: Bongjun Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 18/035,441

(22) PCT Filed: Nov. 17, 2021

(86) PCT No.: PCT/KR2021/016819
§ 371 (c)(1),
(2) Date: May 4, 2023

(87) PCT Pub. No.: WO2022/108311
PCT Pub. Date: May 27, 2022

(65) Prior Publication Data
US 2023/0413199 A1    Dec. 21, 2023

(30) Foreign Application Priority Data

Nov. 18, 2020 (KR) .......................... 10-2020-0154821
Nov. 25, 2020 (KR) .......................... 10-2020-0160256

(51) Int. Cl.
*H04W 56/00* (2009.01)

(52) U.S. Cl.
CPC .............................. *H04W 56/0015* (2013.01)

(58) Field of Classification Search
CPC ...... H04W 56/0015; H04W 4/06; H04W 4/40; H04W 56/00; H04W 56/001; H04W 56/002; H04W 92/18; H04W 56/0025
See application file for complete search history.

(56) References Cited

U.S. PATENT DOCUMENTS

| | | | |
|---|---|---|---|
| 2018/0234928 A1* | 8/2018 | Yasukawa | H04W 92/18 |
| 2020/0288419 A1* | 9/2020 | Gao | H04W 4/46 |
| 2021/0153147 A1* | 5/2021 | Liu | H04W 4/70 |
| 2022/0159599 A1* | 5/2022 | Hakola | H04W 56/0015 |
| 2022/0386255 A1* | 12/2022 | Leon Calvo | H04W 56/002 |
| 2023/0180159 A1* | 6/2023 | Panzner | H04W 56/0015 |
| | | | 370/331 |

* cited by examiner

*Primary Examiner* — Sharmin Chowdhury
(74) *Attorney, Agent, or Firm* — BRYAN CAVE LEIGHTON PAISNER LLP

(57) ABSTRACT

Provided are a method for synchronization between user equipments (UEs) according to a change in a reference synchronization source in a vehicle-to-everything (V2X) communication system, and a device therefor. A first transmission UE transmits information on a change in a reference synchronization source to at least one reception UE, and after a predetermined time, changes the reference synchronization source from the first transmission UE to a second transmission UE.

10 Claims, 28 Drawing Sheets

METHOD FOR SYNCHRONIZATION BETWEEN UEs ACCORDING TO CHANGE IN REFERENCE SYNCHRONIZATION SOURCE IN V2X COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2021/016819, filed on Nov. 17, 2021, which claims the benefit of Korean Patent Application No. 10-2020-0154821 filed on Nov. 18, 2020, and Korean Patent Application No. 10-2020-0160256 filed on Nov. 25, 2020, which are all hereby incorporated by reference herein in their entirety.

TECHNICAL FIELD

The present disclosure relates to a method for synchronization between User Equipments (UEs) according to a change of a reference synchronization source in a Vehicle-To-Everything (V2X) communication system, and an apparatus for the same.

BACKGROUND

3rd Generation Partnership Project (3GPP) Long-Term Evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in International Telecommunication Union (ITU) and 3GPP to develop requirements and specifications for New Radio (NR) systems. 3GPP has to identify and develop the technology components needed for successfully standardizing the new RAT timely satisfying both the urgent market needs, and the more long-term requirements set forth by the ITU Radio communication sector (ITU-R) International Mobile Telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced Mobile BroadBand (eMBB), massive Machine Type Communications (mMTC), Ultra-Reliable and Low Latency Communications (URLLC), etc. The NR shall be inherently forward compatible.

Sidelink (SL) refers to a communication method that establishes a direct link between User Equipments (UE) to directly exchange voice or data between UEs without going through a base station. SL is being considered as a way to solve the burden of base stations due to rapidly increasing data traffic.

Vehicle-To-Everything (V2X) refers to a communication technology that exchanges information with other vehicles, pedestrians, infrastructure objects, etc., through wired and wireless communication. V2X may be categorized into four types: Vehicle-To-Vehicle (V2V), Vehicle-To-Infrastructure (V2I), Vehicle-To-Network (V2N), and/or Vehicle-To-Pedestrian (V2P). V2X communication may be provided through the PC5 interface and/or the Uu interface.

SUMMARY

The procedure for performing SL communication and the procedure for searching/selecting the reference synchronization source during SL communication may be performed independently of each other. Therefore, if the reference synchronization source is changed while performing SL communication, communication disconnection may occur unless all UEs participating in the V2X service are synchronized.

To address the above problems, according to implementations of the present disclosure, a method for addressing communication disconnection that may occur when a reference synchronization source changes during V2X communication may be provided. More specifically, according to implementations of the present disclosure, a method for a plurality of UEs participating in a V2X communication to synchronize with a new reference synchronization source simultaneously may be provided.

In an aspect, a method performed by a first transmitting User Equipment (UE) in a wireless communication system is provided. The method comprises, transmitting information about a change of a reference synchronization source to at least one receiving UE, and changing the reference synchronization source from the first transmitting UE to a second transmitting UE after a period of time.

In another aspect, a method performed by a receiving User Equipment (UE) in a wireless communication system is provided. The method comprises, receiving sidelink services from a first transmitting UE using the first transmitting UE as a reference synchronization source, receiving information from the first transmitting UE about a change of the reference synchronization source, and changing the reference synchronization source from the first transmitting UE to a second transmitting UE after a period of time.

In another aspect, an apparatus implementing the above method is provided.

The present disclosure can have various advantageous effects.

For example, communication disconnection issues that can occur due to a change of the reference synchronization source can be minimized.

For example, broadcast services can be provided continuously after a reference synchronization source change without disconnection.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
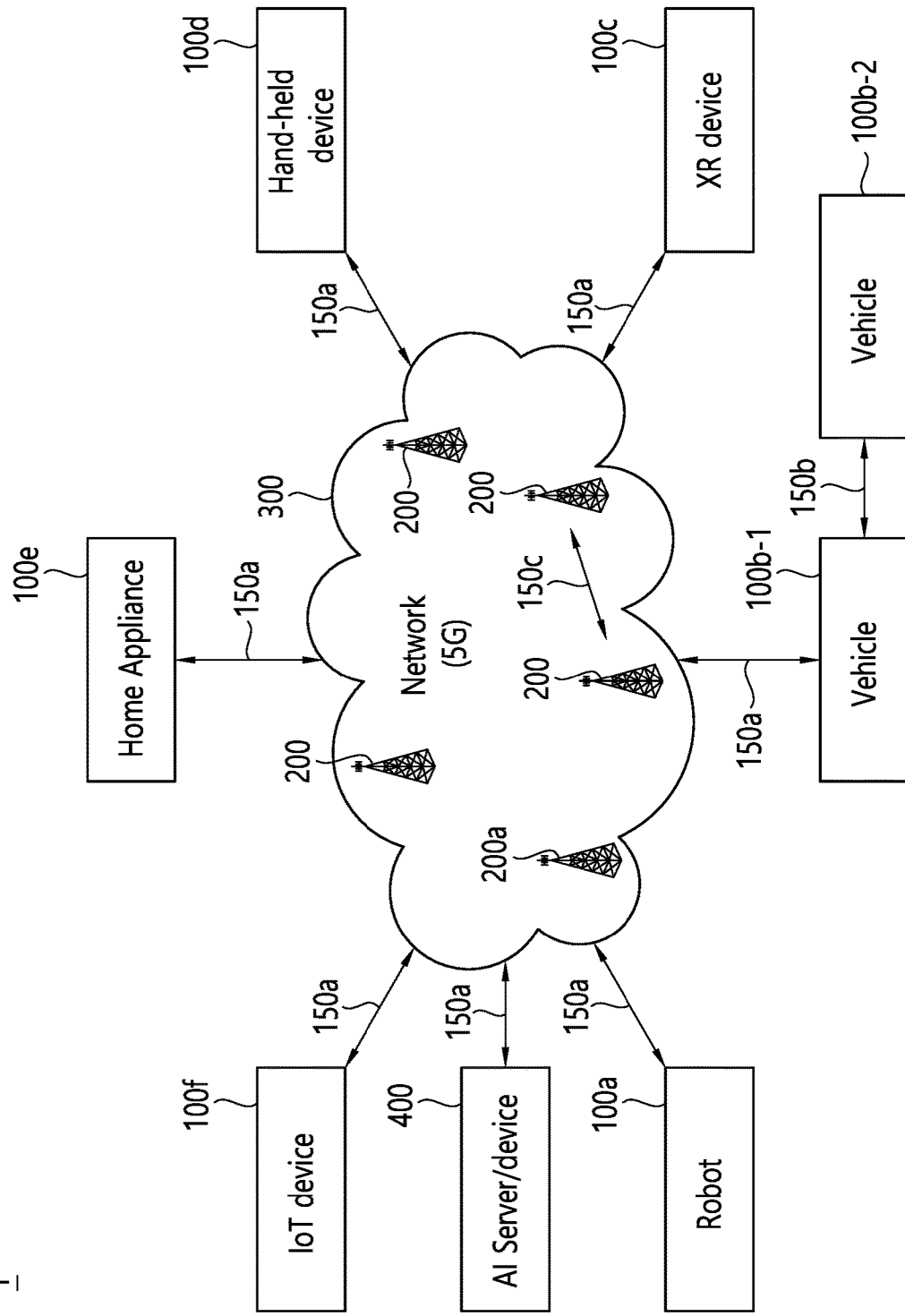
FIG. 1 shows an example of a communication system to which implementations of the present disclosure are applied.

The following techniques, apparatuses, and systems may be applied to a variety of wireless multiple access systems. Examples of the multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. CDMA may be embodied through radio technology such as Universal Terrestrial Radio Access (UTRA) or CDMA2000. TDMA may be embodied through radio technology such as Global System for Mobile communications (GSM), General Packet Radio Service (GPRS), or Enhanced Data rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802.20, or Evolved UTRA (E-UTRA). UTRA is a part of a Universal Mobile Telecommunications System (UMTS). 3rd Generation Partnership Project (3GPP) Long-Term Evolution (LTE) is a part of Evolved UMTS (E-UMTS) using E-UTRA. 3GPP LTE employs OFDMA in downlink (DL) and SC-FDMA in uplink (UL). Evolution of 3GPP LTE includes LTE-Advanced (LTE-A), LTE-A Pro, and/or 5G New Radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B".

Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure are applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced Mobile BroadBand (eMBB), (2) a category of massive Machine Type Communication (mMTC), and (3) a category of Ultra-Reliable and Low Latency Communications (URLLC).

Referring to FIG. 1, the communication system 1 includes wireless devices 100a to 100f, Base Stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using Radio Access Technology (RAT) (e.g., 5G NR or LTE) and may be referred to as communication/radio/5G devices. The wireless devices 100a to 100f may include, without being limited to, a robot 100a, vehicles 100b-1 and 100b-2, an eXtended Reality (XR) device 100c, a hand-held device 100d, a home appliance 100e, an Internet-of-Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called User Equipments (UEs). A UE may include, for example, a cellular phone, a smartphone, a laptop computer, a digital broadcast terminal, a Personal Digital Assistant (PDA), a Portable Multimedia Player (PMP), a navigation system, a slate Personal Computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a Closed-Circuit TV (CCTV), a recorder, or a black box.

The FinTech device may be, for example, a device capable of providing a financial service such as mobile payment. For example, the FinTech device may include a payment device or a Point of Sales (PoS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (JAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through Computer Graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple Sub-Carrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., Frequency Range 1 (FR1) and Frequency Range 2 (FR2). The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter Wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include NarrowBand IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate Personal Area Networks (PANs) associated with small/low-power digital communication based on various specifications such as IEEE 802.15.4 and may be called various names.

Figure 2:
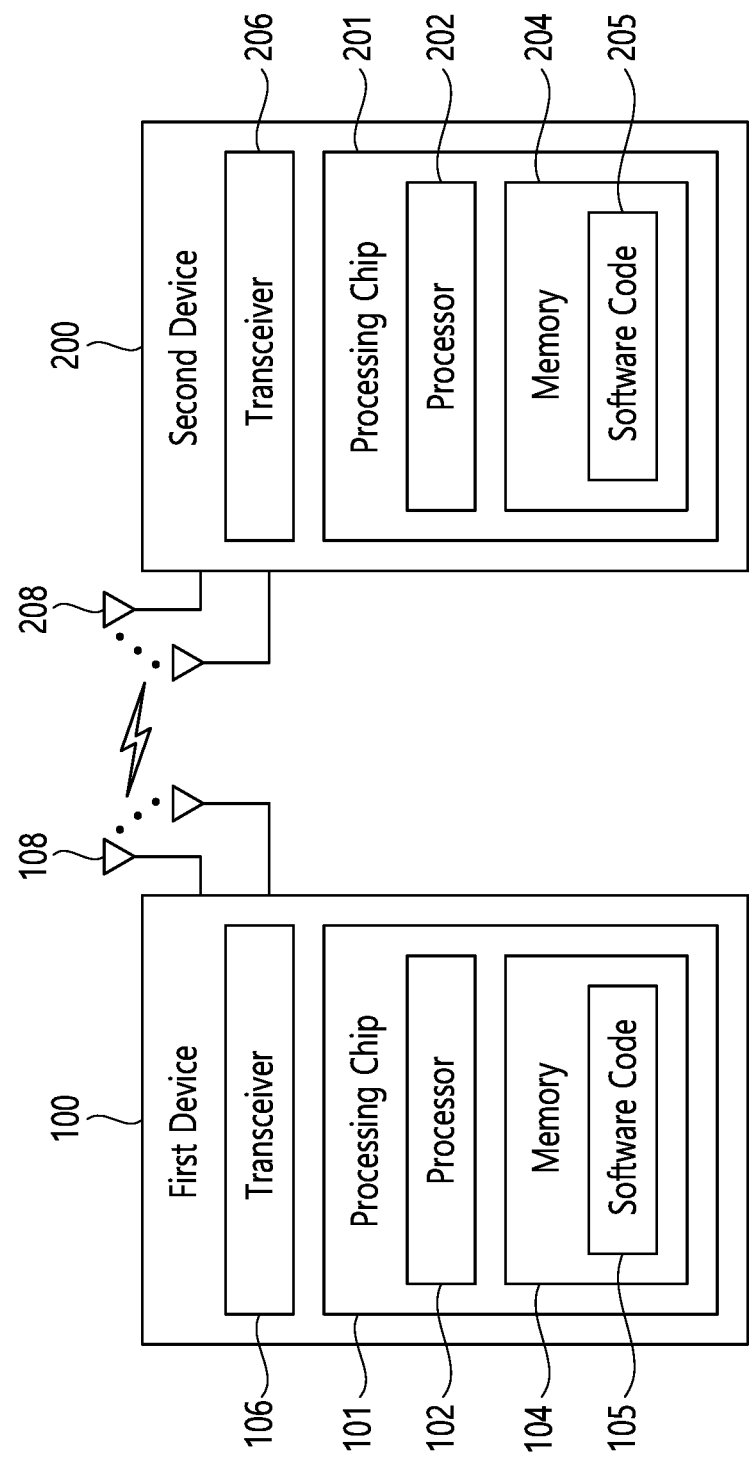
FIG. 2 shows an example of wireless devices to which implementations of the present disclosure are applied.

FIG. 2 shows an example of wireless devices to which implementations of the present disclosure are applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with Radio Frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, Media Access Control (MAC) layer, Radio Link Control (RLC) layer, Packet Data Convergence Protocol (PDCP) layer, Radio Resource Control (RRC) layer, and Service Data Adaptation Protocol (SDAP) layer). The one or more processors 102 and 202 may generate one or more Protocol Data Units (PDUs) and/or one or more Service Data Units (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable ROMs (EEPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in UL and as a receiving device in DL. In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a Node B (NB), an eNode B (eNB), or a gNB.

Figure 3:
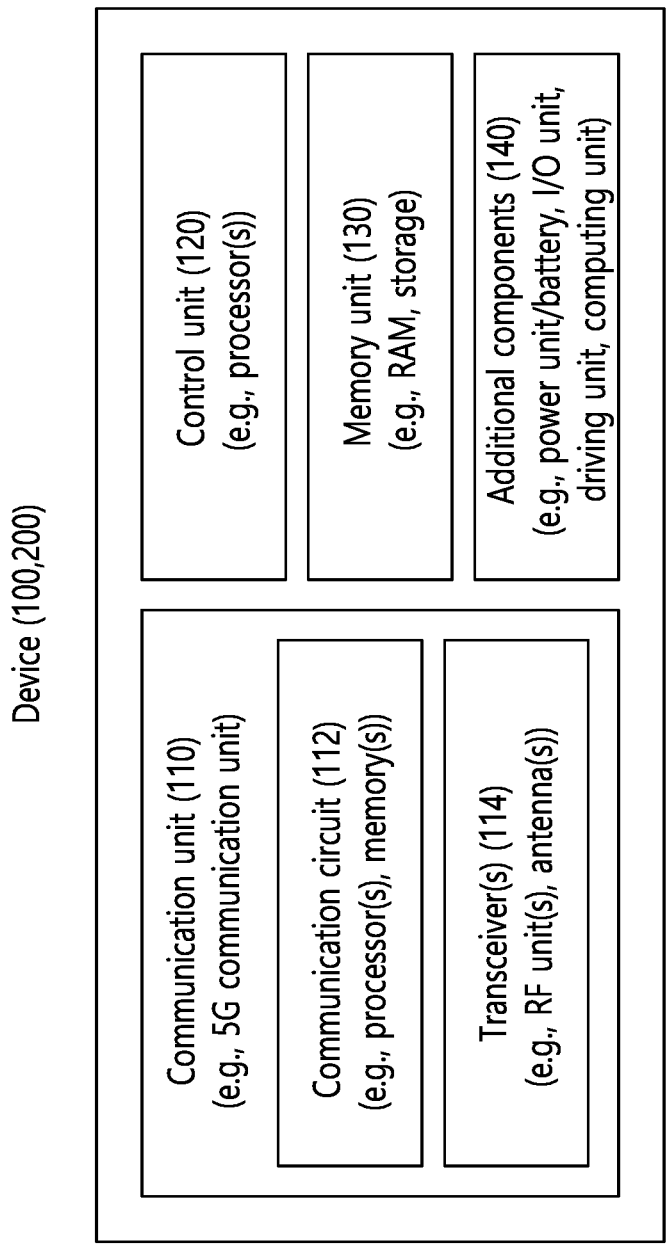
FIG. 3 shows an example of a wireless device to which implementations of the present disclosure are applied.

FIG. 3 shows an example of a wireless device to which implementations of the present disclosure are applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, Input/Output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an Application Processor (AP), an Electronic Control Unit (ECU), a Central Processing Unit (CPU), a Graphical Processing Unit (GPU), and a memory control processor. As another example, the memory unit 130 may be configured by a RAM, a Dynamic RAM (DRAM), a ROM, a flash memory, a volatile memory, a non-volatile memory, and/or a combination thereof.

Figure 4:
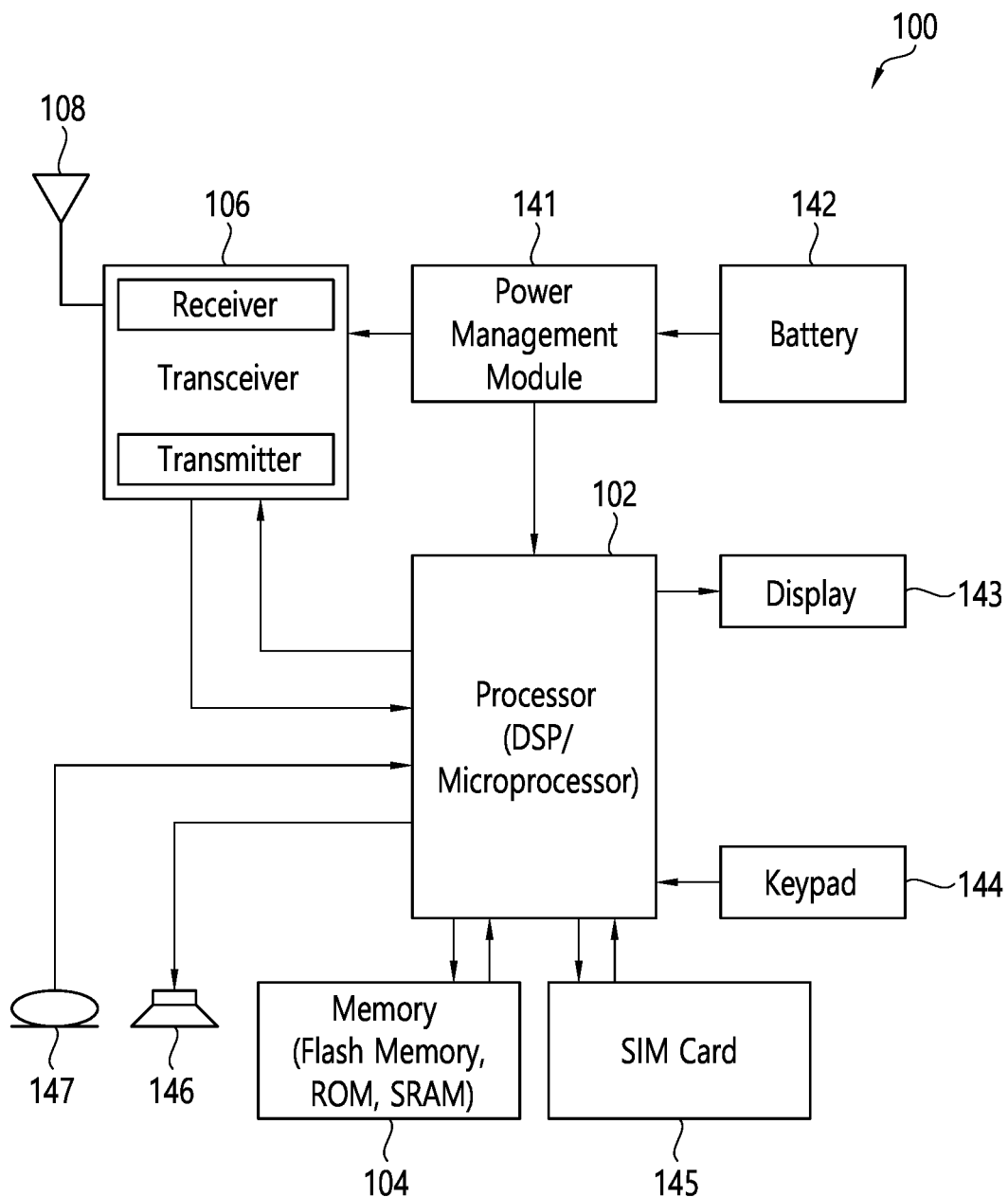
FIG. 4 shows an example of UE to which implementations of the present disclosure are applied.

FIG. 4 shows an example of UE to which implementations of the present disclosure are applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 141, a battery 142, a display 143, a keypad 144, a Subscriber Identification Module (SIM) card 145, a speaker 146, and a microphone 147.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of DSP, CPU, GPU, a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 141 manages power for the processor 102 and/or the transceiver 106. The battery 142 supplies power to the power management module 141.

The display 143 outputs results processed by the processor 102. The keypad 144 receives inputs to be used by the processor 102. The keypad 144 may be shown on the display 143.

The SIM card 145 is an integrated circuit that is intended to securely store the International Mobile Subscriber Identity (IMSI) number and its related key, which are used to identify and authenticate subscribers on mobile telephony devices (such as mobile phones and computers). It is also possible to store contact information on many SIM cards.

The speaker 146 outputs sound-related results processed by the processor 102. The microphone 147 receives sound-related inputs to be used by the processor 102.

Figure 5:
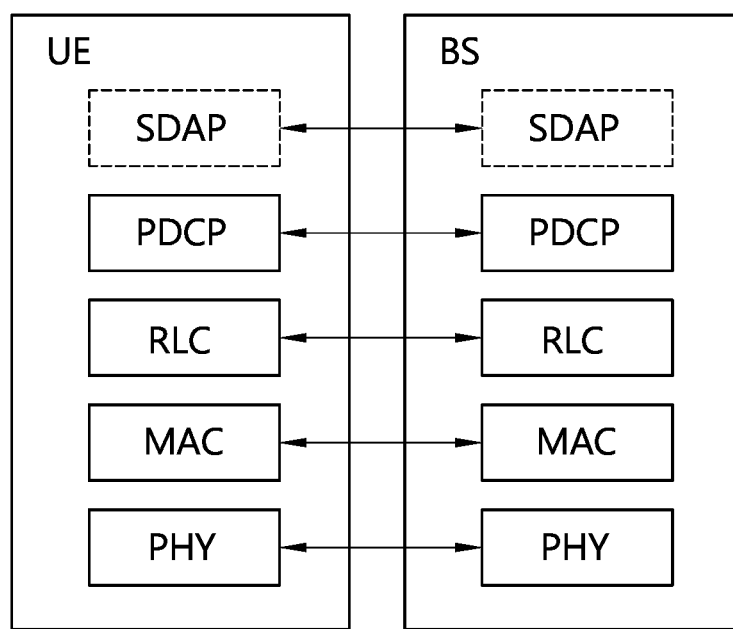
FIGS. 5 and 6 show an example of protocol stacks in a 3GPP based wireless communication system to which implementations of the present disclosure are applied.
Figure 6:
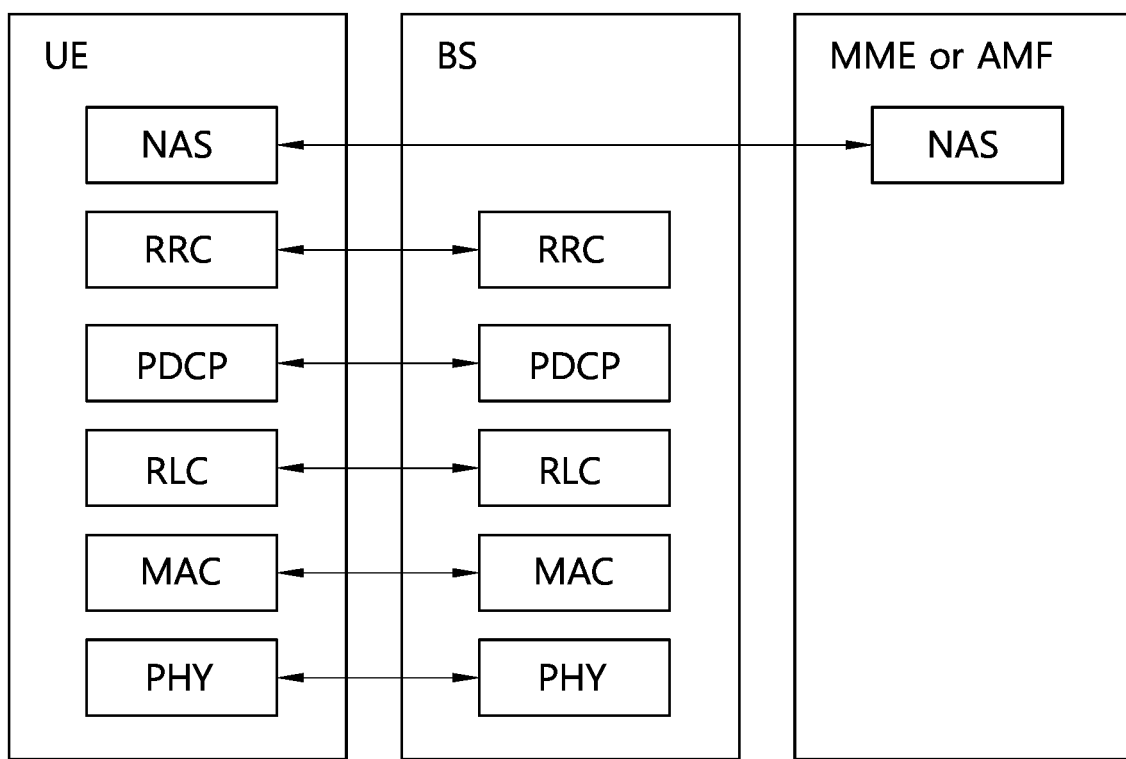

FIGS. 5 and 6 show an example of protocol stacks in a 3GPP based wireless communication system to which implementations of the present disclosure are applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a Non-Access Stratum (NAS) layer. Layer 1, Layer 2 and Layer 3 are referred to as an Access Stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network Quality of Service (QoS) flows.

In the 3GPP NR system, the main services and functions of the MAC sublayer include: mapping between logical channels and transport channels; multiplexing/de-multiplexing of MAC SDUs belonging to one or different logical channels into/from Transport Blocks (TB) delivered to/from the physical layer on transport channels; scheduling information reporting; error correction through Hybrid Automatic Repeat reQuest (HARQ) (one HARQ entity per cell in case of Carrier Aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information.

Each logical channel type is defined by what type of information is transferred. Logical channels are classified into two groups: control channels and traffic channels. Control channels are used for the transfer of control plane information only, and traffic channels are used for the transfer of user plane information only. Broadcast Control Channel (BCCH) is a downlink logical channel for broadcasting system control information, Paging Control Channel (PCCH) is a downlink logical channel that transfers paging information, system information change notifications and indications of ongoing Public Warning Service (PWS) broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In downlink, the following connections between logical channels and transport channels exist: BCCH can be mapped to Broadcast Channel (BCH); BCCH can be mapped to Downlink Shared Channel (DL-SCH); PCCH can be mapped to Paging Channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to Uplink Shared Channel (UL-SCH); DCCH can be mapped to UL-SCH; and DTCH can be mapped to UL-SCH.

The RLC sublayer supports three transmission modes: Transparent Mode (TM), Unacknowledged Mode (UM), and Acknowledged Mode (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using Robust Header Compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS Flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G Core network (5GC) or Next-Generation Radio Access Network (NG-RAN); establishment, maintenance and release of an RRC connection between the UE and NG-RAN; security functions including key management; establishment, configuration, maintenance and release of Signaling Radio Bearers (SRBs) and Data Radio Bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
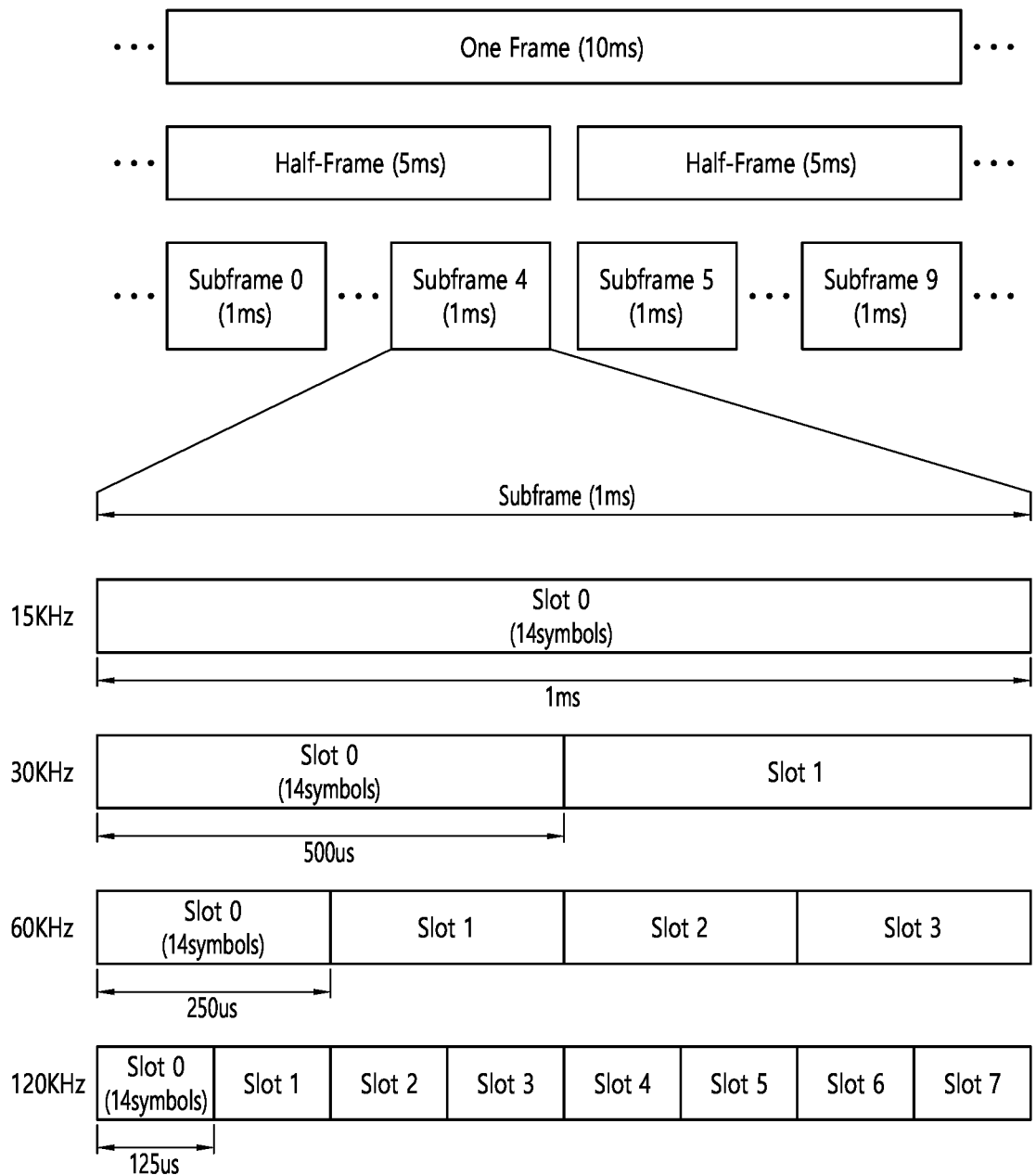
FIG. 7 shows a frame structure in a 3GPP based wireless communication system to which implementations of the present disclosure are applied.

FIG. 7 shows a frame structure in a 3GPP based wireless communication system to which implementations of the present disclosure are applied.

The frame structure shown in FIG. 7 is purely exemplary and the number of subframes, the number of slots, and/or the number of symbols in a frame may be variously changed. In the 3GPP based wireless communication system, OFDM numerologies (e.g., SCS, Transmission Time Interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or Cyclic Prefix (CP)-OFDM symbols), SC-FDMA symbols (or Discrete Fourier Transform-spread-OFDM (DFT-s-OFDM) symbols).

Referring to FIG. 7, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a CP. In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 3

| u | $N^{slot}_{symb}$ | $N^{frame,u}_{slot}$ | $N^{subframe,u}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 4

| u | $N^{slot}_{symb}$ | $N^{frame,u}_{slot}$ | $N^{subframe,u}_{slot}$ |
| --- | --- | --- | --- |
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at Common Resource Block (CRB) $N^{start,u}_{grid}$ indicated by higher-layer signaling (e.g., RRC signaling), where $N^{size,u}_{grid,x}$ is the number of Resource Blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a Resource Element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and Physical Resource Blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a BandWidth Part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the PHY layer, the uplink transport channels UL-SCH and Random Access Channel (RACH) are mapped to their physical channels Physical Uplink Shared Channel (PUSCH) and Physical Random Access Channel (PRACH), respectively, and the downlink transport channels DL-SCH, BCH and PCH are mapped to Physical Downlink Shared Channel (PDSCH), Physical Broadcast Channel (PBCH) and PDSCH, respectively. In the PHY layer, Uplink Control Information (UCI) is mapped to PUCCH, and Downlink Control Information (DCI) is mapped to Physical Downlink Control Channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Hereinafter, Vehicle-To-Everything (V2X) communications and/or Sidelink (SL) communications are described.

For example, the UE1 may select a resource unit corresponding to a particular resource within a resource pool, which is a set of resources. The UE1 may then transmit an SL signal using the resource unit. For example, the UE2, the receiving UE, may be configured with a resource pool over which the UE1 may transmit the signal, and may detect the signal of UE1 within the resource pool.

Here, if the UE1 is within the connectivity range of the base station, the base station may inform the UE1 of the resource pool. On the other hand, if the UE1 is out of the connectivity range of the base station, another UE may inform the UE1 of the resource pool, or the UE1 may use a preconfigured resource pool.

In general, a resource pool may consist of a plurality of resource units, and each UE may select one or more resource units to use for its SL signal transmission.

A resource unit may appear periodically and repeatedly. Alternatively, the index of the physical resource unit to which one logical resource unit is mapped may vary over time in a predetermined pattern, in order to achieve a diversity effect in the time or frequency domain. In terms of the structure of these resource units, a resource pool may refer to a set of resource units that are available for transmission by a UE that wishes to transmit SL signaling.

Hereinafter, resource allocation in SL is described.

A UE may perform V2X communication and/or SL communication depending on the transmission mode. The transmission mode may be referred to as a mode and/or a resource allocation mode. The transmission mode in an LTE system may be referred to as an LTE transmission mode, and the transmission mode in an NR system may be referred to as an NR resource allocation mode. LTE transmission mode ½ may be applied to general SL communication, and LTE transmission mode ¾ may be applied to V2X communication.

In LTE transmission mode 1, LTE transmission mode 3, and/or NR resource allocation mode 1, the base station may schedule the SL resources to be used by the UEs for SL transmission. For example, the base station may perform resource scheduling by transmitting a DCI via PDCCH to UE1, and UE1 may perform V2X communication and/or SL communication with UE2 based on the resource scheduling. For example, UE1 may transmit Sidelink Control Information (SCI) to UE2 via a Physical Sidelink Control Channel (PSCCH), and then transmit data based on the SCI to UE2 via a Physical Sidelink Shared Channel (PSSCH).

For example, in NR resource allocation mode 1, the UE may be provided and/or allocated resources for one or more SL transmissions of one TB by the base station via dynamic grant. For example, the base station may provide resources to the UE for the transmission of PSCCH and/or PSSCH using dynamic grant. For example, the transmitting UE may report to the base station the SL HARQ feedback received from the receiving UE. In this case, the PUCCH resources and timing for reporting the SL HARQ feedback to the base station may be determined based on the instructions in the PDCCH for the base station to allocate resources for SL transmission.

For example, in NR resource allocation mode 1, the UE may periodically be provided and/or allocated a set of resources for a plurality of SL transmissions by the base station via a configured grant. For example, the configured grant may include a configured grant type 1 or a configured grant type 2. For example, the UE may determine the TB to be transmitted at each of the occasions indicated by a given configured grant.

In LTE transmission mode 2, LTE transmission mode 4, and/or NR resource allocation mode 2, the UE may determine the SL transmission resource within the SL resource configured by the base station/network and/or the preconfigured SL resource. For example, the configured SL resource and/or the preconfigured SL resource may be a resource pool. For example, the UE may autonomously select or schedule resources for SL transmission. For example, the UE may autonomously select a resource within the configured resource pool to perform V2X communication and/or SL communication. For example, the UE may perform a sensing and resource (re)selection procedure to autonomously select a resource within a selection window. For example, the sensing may be performed on a subchannel unit. Then, upon autonomously selecting a resource within the resource pool, UE1 may transmit a SCI to UE2 via PSCCH, and then transmit data based on the SCI to UE2 via PSSCH.

Hereinafter, Sidelink Synchronization Signal (SL-SS) and synchronization information are described.

The SL-SS is an SL-specific sequence that may include a Primary Sidelink Synchronization Signal (PSSS) and a Secondary Sidelink Synchronization Signal (SSSS). The PSSS may be referred to as the Sidelink Primary Synchronization Signal (S-PSS), and the SSSS may be referred to as the Sidelink Secondary Synchronization Signal (S-SSS). For example, length-127 M-sequences may be used for the S-PSS, and length-127 Gold sequences may be used for the S-SSS. For example, the UE may use the S-PSS to detect the initial signal and obtain the synchronization. For example, the UE may use S-PSS and S-SSS to acquire detailed synchronization, and may detect the synchronization signal ID.

The Physical Sidelink Broadcast Channel (PSBCH) may be a (broadcast) channel on which basic (system) information is transmitted that the UE needs to know first before transmitting or receiving SL signaling. For example, the basic information may include information related to SL-SS, duplex mode, Time Division Duplex (TDD) Uplink/Downlink (UL/DL) configurations, information related to resource pool, type of application related to SL-SS, subframe offset, broadcast information, etc. For example, to evaluate PSBCH performance, in NR V2X, the payload size of a PSBCH may be 56 bits, including a 24-bit Cyclic Redundancy Check (CRC).

S-PSS, S-SSS and PSBCH may be included in a block format (e.g., SL-SS/PSBCH block, hereinafter referred to as Sidelink Synchronization Signal Block (SL-SSB)) that supports periodic transmission. The SL-SSB may have the same numerology (i.e., SCS and/or CP length) as the PSCCH/PSSCH in the carrier, and the transmission bandwidth may be within a (preconfigured) SL BWP. For example, an SL-SSB may have a bandwidth of 11 RB. For example, the PSBCH may span 11 RBs. The frequency position of the S-SSB may be (pre)configured. Thus, the UE does not need to perform hypothesis detection at the frequency to discover the SL-SSB on the carrier.

Meanwhile, each SL-SS may have an SL-SS Identifier (ID).

For example, for LTE SL or LTE V2X, the value of the SL-SS ID may be defined based on a combination of two different S-PSS sequences and 168 different S-SSS sequences. For example, the number of SL-SS IDs may be 336. For example, the value of the SL-SS ID may be any one of 0 to 335.

For example, for NR SL or NR V2X, the value of the SL-SS ID may be defined based on a combination of two different S-PSS sequences and 336 different S-SSS sequences. For example, the number of SL-SS IDs may be 672. For example, the value of the SL-SS ID may be any one of 0 to 671. For example, from among the two different S-PSSs, one S-PSS may be associated with in-coverage and the other S-PSS may be associated with out-of-coverage. For example, an SL-SS ID of 0 to 335 may be used in in-coverage, and an SL-SS ID of 336 to 671 may be used in out-of-coverage.

Figure 8:
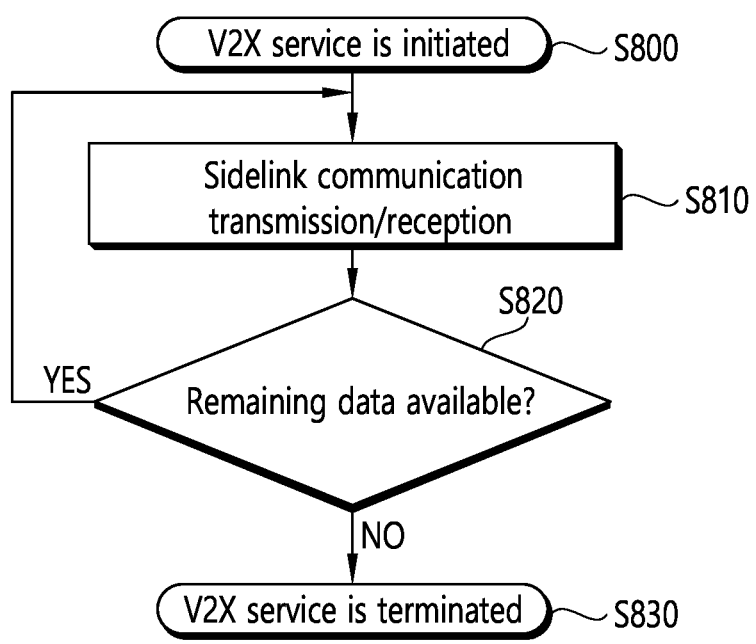
FIG. 8 shows an example of a progression of SL communications from the start to the end of a V2X service to which implementations of the present disclosure are applied.

FIG. 8 shows an example of a progression of SL communications from the start to the end of a V2X service to which implementations of the present disclosure are applied.

In step S800, a V2X service is initiated.

In step S810, the UE performs transmission/reception of the SL communication.

In step S820, the UE determines whether there is remaining data available. If there is remaining data available, the UE returns to step S810 and continues to transmit/receive the SL communication.

If there is no remaining data available, the V2X service is terminated in step S830.

Figure 9:
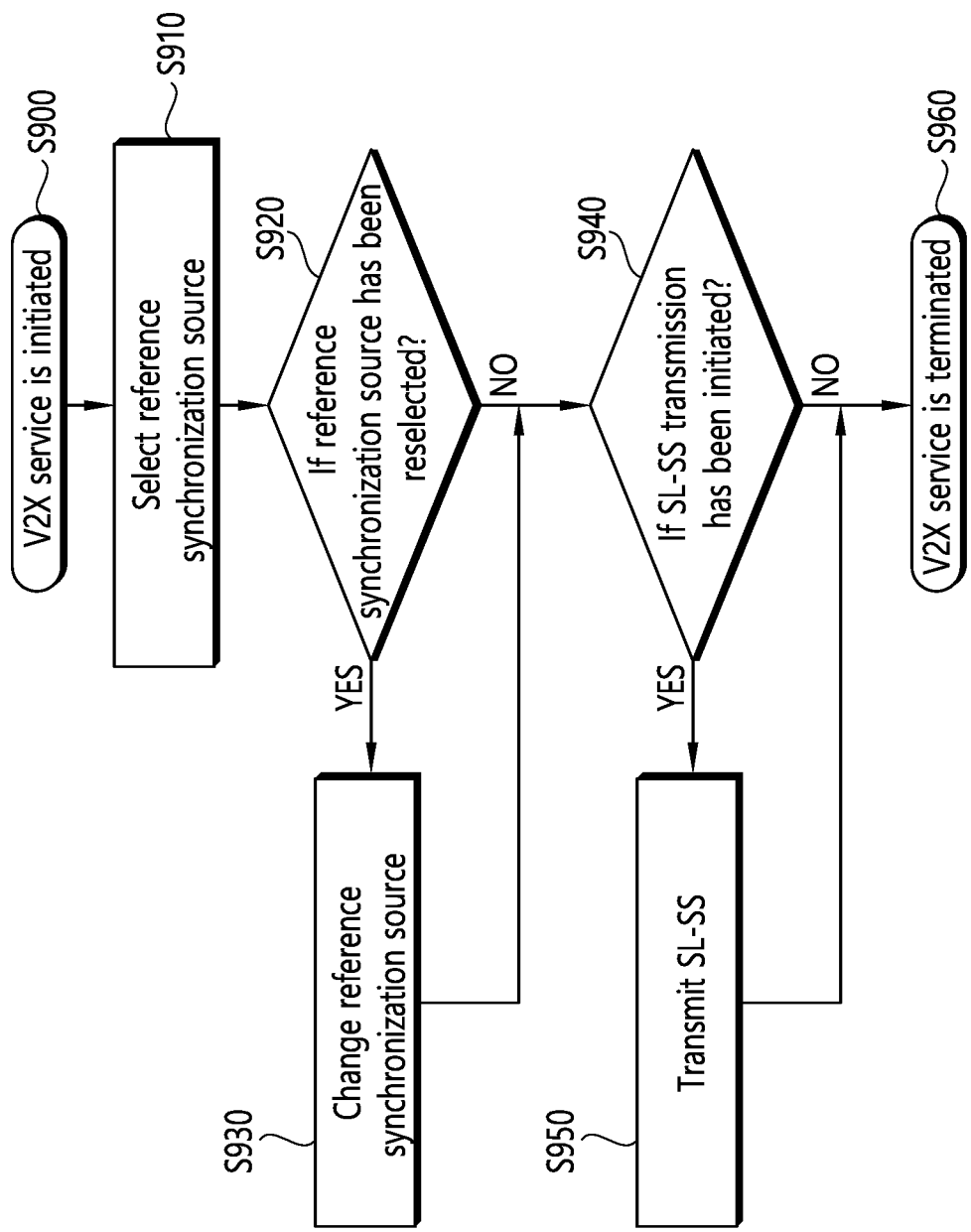
FIG. 9 shows an example of a procedure for a UE to search for/select a reference synchronization source in the course of a V2X service to which implementations of the present disclosure are applied.

FIG. 9 shows an example of a procedure for a UE to search for/select a reference synchronization source in the course of a V2X service to which implementations of the present disclosure are applied.

In step S900, a V2X service is initiated.

In step S910, the UE selects a reference synchronization source.

In step S920, the UE determines whether the reference synchronization source has been reselected.

If the reference synchronization source has been reselected, in step SS930, the UE changes the reference synchronization source.

In step S940, the UE determines whether the transmission of the SL-SS has been initiated.

If the transmission of the SL-SS has been initiated, in step S950, the UE transmits the SL-SS.

In step S960, the V2X service is terminated.

Figure 10:
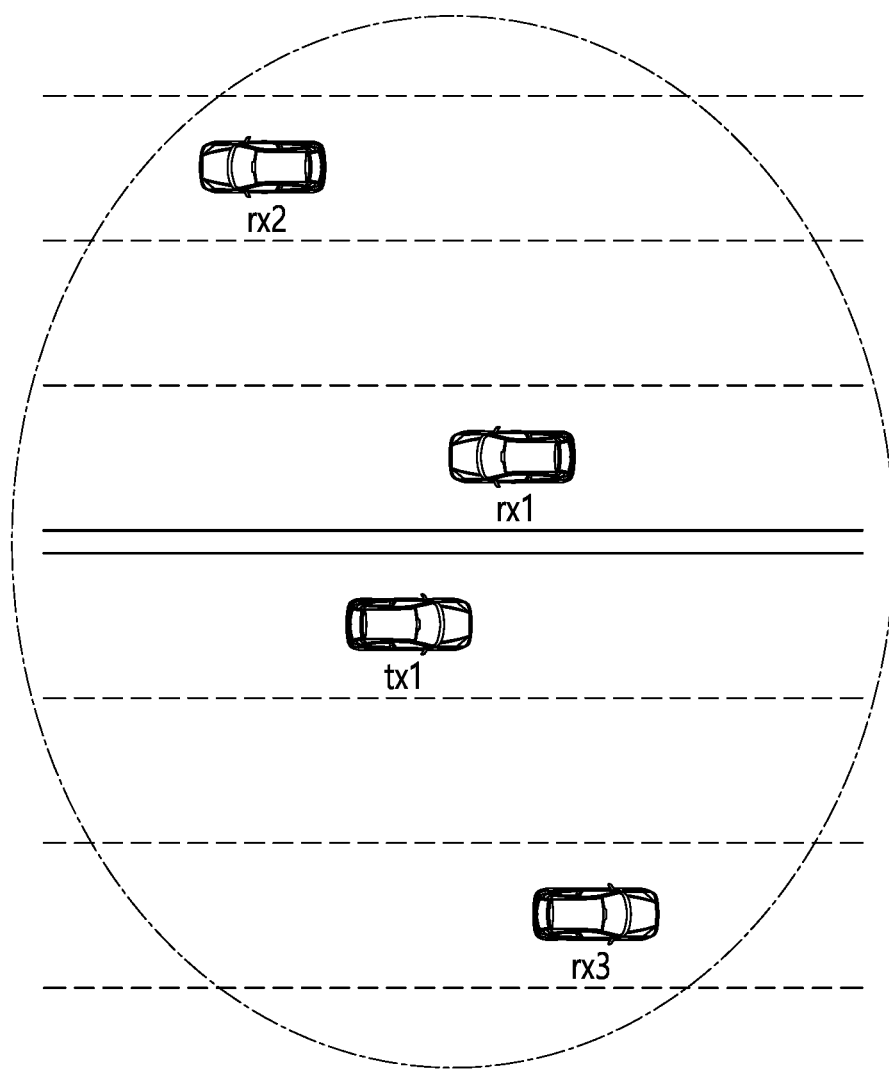
FIG. 10 shows an example in which a V2X communication is performed to which implementations of the present disclosure are applied.

FIG. 10 shows an example in which a V2X communication is performed to which implementations of the present disclosure are applied.

Referring to FIG. 10, four vehicles are participating in a V2X communication. Vehicle tx1 provides V2X services to three neighboring vehicles rx1, rx2, and rx3. For example, vehicle tx1 may provide unicast/groupcast services to vehicle rx1. For example, vehicle TX1 may provide broadcast services to vehicles rx2, rx3.

Figure 11:
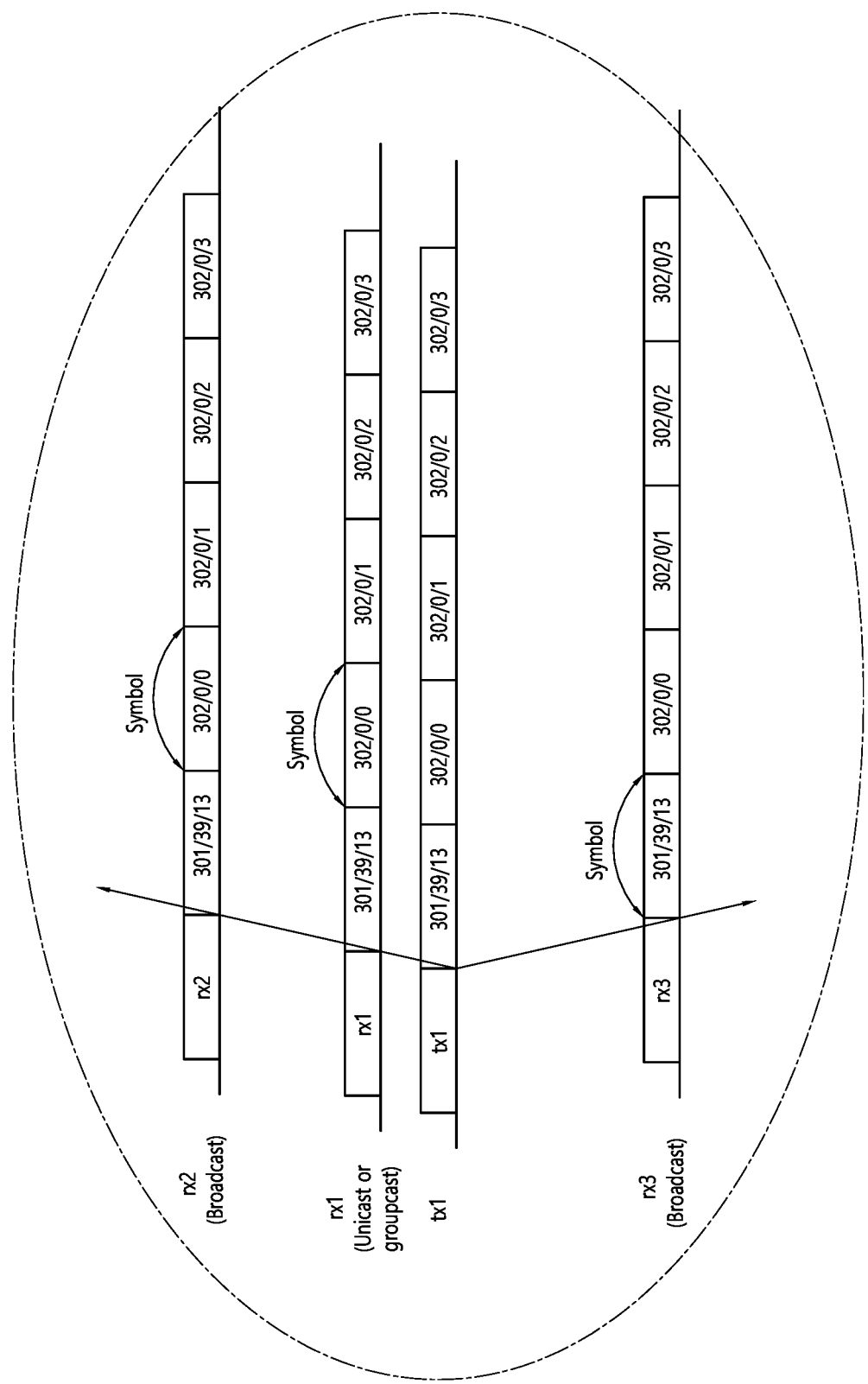
FIG. 11 shows an example of a timeline of a plurality of vehicles performing a V2X communication to which implementations of the present disclosure are applied.

FIG. 11 shows an example of a timeline of a plurality of vehicles performing a V2X communication to which implementations of the present disclosure are applied.

The timeline in FIG. 11 shows the timeline of vehicles tx1, rx1, rx2, and rx3 performing V2X communication in FIG. 10, i.e., timeline of a case that vehicle tx1 is providing V2X services to three neighboring vehicles rx1, rx2, and rx3. In FIG. 11, the horizontal axis represents time, and each cell represents a 1 symbol. The numbers in each cell represent, in order, the System Frame Number (SFN) number/slot number/symbol number. In FIG. 11, the vertical axis represents the mutual distance between vehicles. In FIG. 11, the solid arrow line starting from vehicle tx1 indicates the propagation delay as a function of distance from vehicle tx1 to vehicles rx1, rx2, and rx3. That is, as the distance from vehicle tx1 increases, the propagation delay also increases.

Referring to FIG. 11, vehicle tx1 and vehicles rx1, rx2, and rx3 are all synchronized. That is, vehicle tx1 may be a reference synchronization source. More specifically, vehicle tx1 broadcasts an SL-SSB, and vehicles rx1, rx2, and rx3 may synchronize with vehicle tx1 based on the received SL-SSB. Based on the synchronization, the time (i.e., SFN/slot/symbol) of vehicle tx1 and vehicles rx1, rx2, and rx3 may be aligned. For example, the time of vehicle tx1 having an SFN number/slot number/symbol number of 301/39/13 may be aligned with the time of vehicle rx1, rx2, rx3 having an SFN number/slot number/symbol number of 301/39/13, considering propagation delays.

Figure 12:
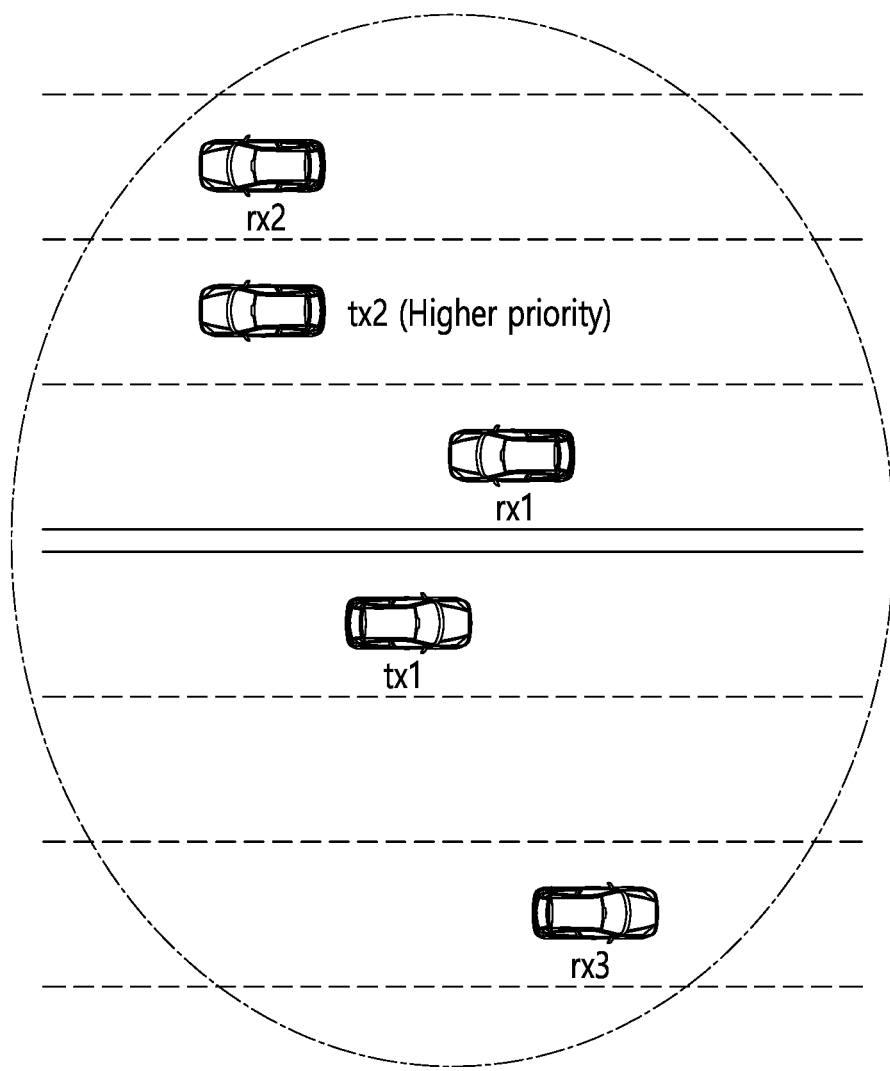
FIG. 12 shows another example in which a V2X communication is performed to which implementations of the present disclosure are applied.

FIG. 12 shows another example in which a V2X communication is performed to which implementations of the present disclosure are applied.

Referring to FIG. 12, a vehicle tx2 is added to the example described in FIG. 10. It is assumed that vehicle tx2 can be a reference synchronization source with a higher priority than other vehicles (e.g., vehicle tx1).

Referring to FIG. 12, vehicle tx2 may receive an SL-SSB transmitted by vehicle tx1. Upon receiving it, vehicle tx2 may recognize that it is a higher priority reference synchronization source than vehicle tx1. Furthermore, if the Reference Signal Received Power (RSRP) of the reference synchronization source is lower than a certain threshold value, the SL-SSB may be transmitted. Then, the neighboring vehicles can receive the SL-SSB transmitted by vehicle tx2 and perform synchronization.

In this case, vehicle tx1 and vehicles rx1, rx2, and rx3 may be performing V2X communication. Therefore, if all vehicles are not synchronized with the new reference synchronization source, vehicle tx2, at the same time, a situation may occur in which V2X communication between vehicles is interrupted. In other words, in FIG. 12, when the reference synchronization source is changed from vehicle tx1 to vehicle tx2, the V2X communication that was being performed with vehicle tx1 as the reference synchronization source may be interrupted momentarily due to the changed timing.

Figure 13:
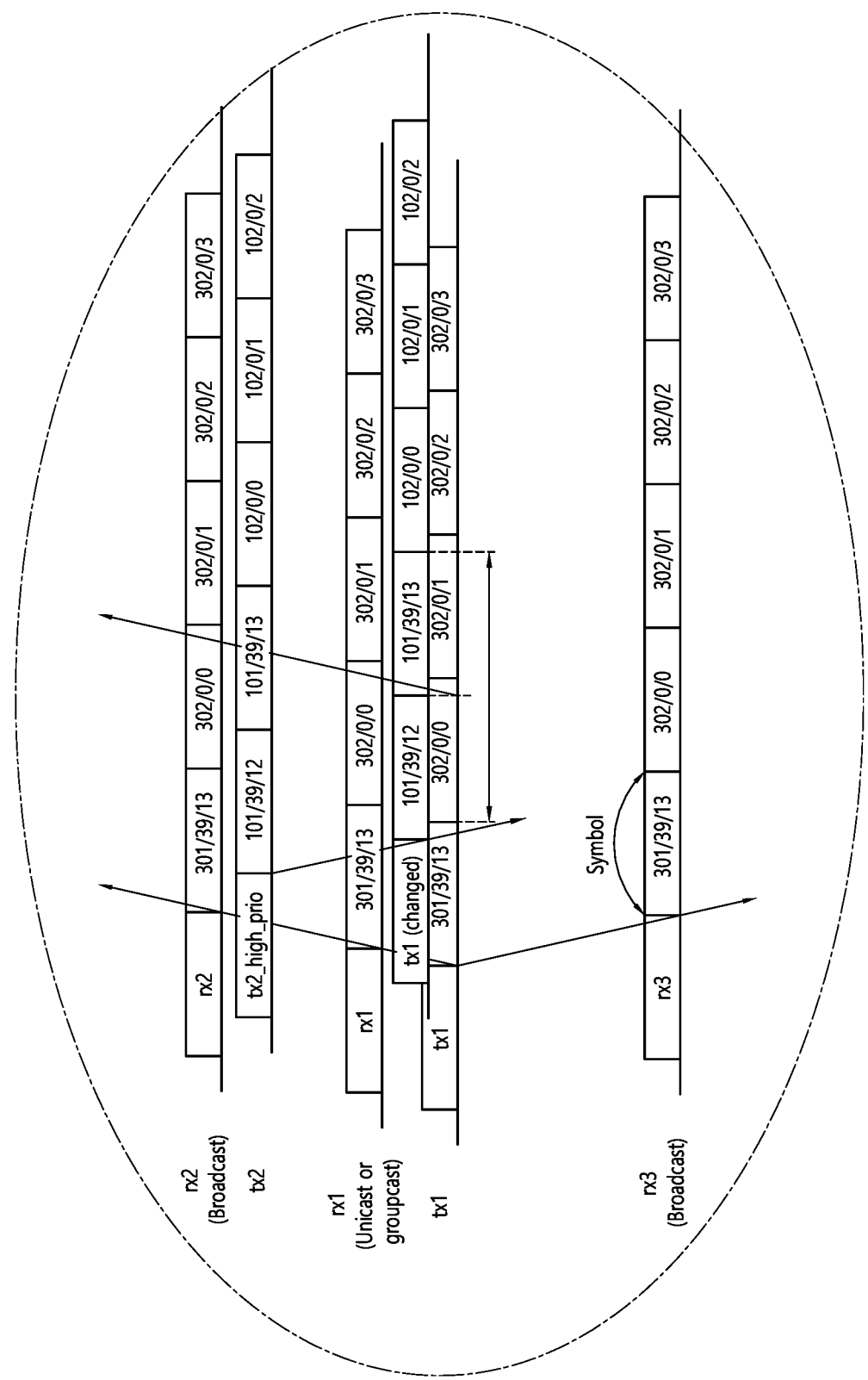
FIG. 13 shows another example of a timeline of a plurality of vehicles performing a V2X communication to which implementations of the present disclosure are applied.

FIG. 13 shows another example of a timeline of a plurality of vehicles performing a V2X communication to which implementations of the present disclosure are applied.

The timeline in FIG. 13 represents a timeline of vehicles tx1, tx2, rx1, rx2, rx3 performing V2X communication in FIG. 12, i.e., timeline of a case that vehicle tx1 is providing V2X services to three neighboring vehicles rx1, rx2, and rx3, and vehicle tx2 emerges as a new reference synchronization source.

Referring to FIG. 13, through the reselection of the reference synchronization source, the reference synchronization source is changed from vehicle tx1 to vehicle tx2, which has a higher priority. Accordingly, considering the SFN number/slot number/symbol number of vehicle tx2 and the propagation delay from vehicle tx2, the timing of vehicle tx1 is changed (e.g., from 302/0/0 to 101/39/12 at a similar time in the SFN number/slot number/symbol number).

However, it is assumed that vehicle rx1, which has been receiving unicast/groupcast services from vehicle tx1, has not yet changed its reference synchronization source to vehicle tx2. That is, vehicle rx1 still tries to perform V2X communication with vehicle tx1 as the reference synchronization source. In this case, if vehicle tx1 changes the reference synchronization source to vehicle tx2 without any instruction/notification regarding the change of reference synchronization source and tries to perform V2X communication based on the changed timing, vehicle rx1 cannot know the changed timing of vehicle tx1. Therefore, until vehicle rx1 changes the reference synchronization source to vehicle tx2 and changes the timing, V2X communication with vehicle tx1 may be disconnected.

If the RSRP of the SL-SSB received from vehicle tx2 is above a certain threshold, vehicle tx1 does not need to transmit the SL-SSB after reselecting the reference synchronization source to vehicle tx2. Therefore, vehicle rx1 has no way to know the changed timing of vehicle tx1 by receiving the SL-SSB from vehicle tx1, and can only synchronize with vehicle tx2 directly to match the changed timing of vehicle tx1. If a problem such as blocking occurs due to a loss of Line-Of-Sight (LOS) between vehicle tx2 and vehicle rx1, vehicle rx1 may not be able to synchronize with vehicle tx2, and as a result, V2X communication with vehicle tx1 may be interrupted.

Figure 14:
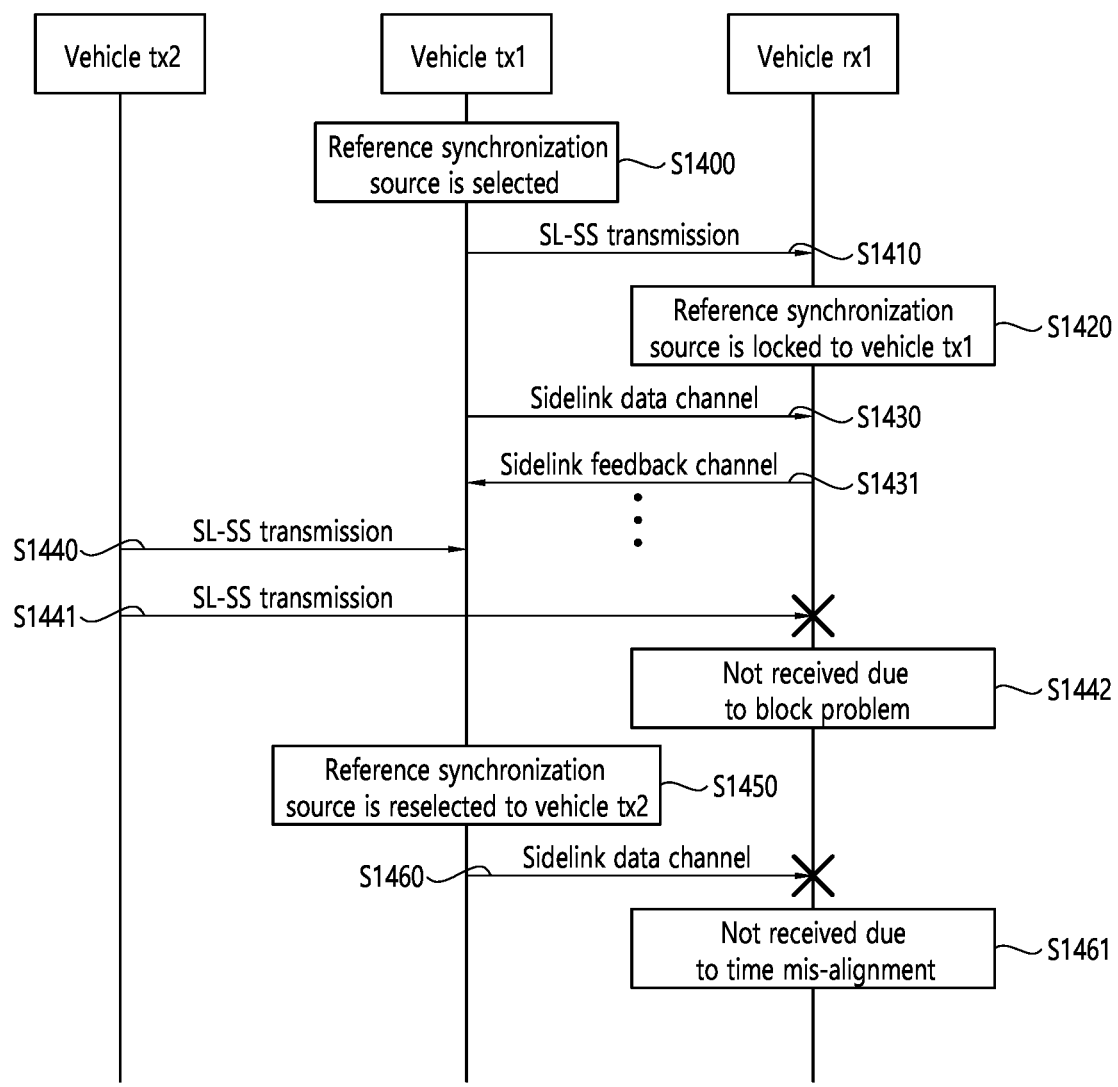
FIG. 14 shows an example of a case where V2X communication is interrupted when a reference synchronization source is reselected to which implementations of the present disclosure are applied.

FIG. 14 shows an example of a case where V2X communication is interrupted when a reference synchronization source is reselected to which implementations of the present disclosure are applied.

In step S1400, vehicle tx1 is selected as the reference synchronization source.

In step S1410, vehicle tx1 transmits SL-SS.

In step S1420, upon receiving the SL-SS from vehicle tx1, vehicle rx1 locks the reference synchronization source to vehicle tx1. That is, the timing of the V2X communication between vehicle tx1 and vehicle rx1 is aligned with respect to vehicle tx1.

In step S1430, vehicle tx1 transmits the SL data channel to vehicle rx1. In step S1431, vehicle rx1 transmits an SL feedback channel for the SL data channel to vehicle tx1.

In step S1440 and step S1441, vehicle tx2 appears and transmits an SL-SS. It is assumed that vehicle tx2 can be a reference synchronization source with a higher priority than other vehicles (e.g., vehicle tx1).

In this case, only one of the two vehicles performing V2X communication can normally receive the SL-SS from the new reference synchronization source. That is, the SL-SS transmitted by vehicle tx2 in step S1440 is normally received by vehicle tx1. However, the SL-SS transmitted by vehicle tx2 in step S1441 may not be received normally by vehicle rx1 due to a possible problem. For example, in step S1442, due to a blocking problem between vehicle tx2 and vehicle rx1, vehicle rx1 may not be able to receive the SL-SS transmitted by vehicle tx2.

In step S1450, vehicle tx1 reselects the reference synchronization source to vehicle tx2. Vehicle tx1 performs synchronization with vehicle tx2, whereby the timing of vehicle tx1 is aligned with respect to vehicle tx2.

In step S1460, vehicle tx1 transmits the SL data channel to vehicle rx1. The transmission of the SL data channel may be based on the changed timing.

In step S1461, due to a time misalignment between vehicle rx1 and vehicle tx1 (i.e., vehicle rx1 is not aware of the changed timing of vehicle tx1), vehicle rx1 is unable to receive the SL data channel transmitted by vehicle tx1.

Figure 15:
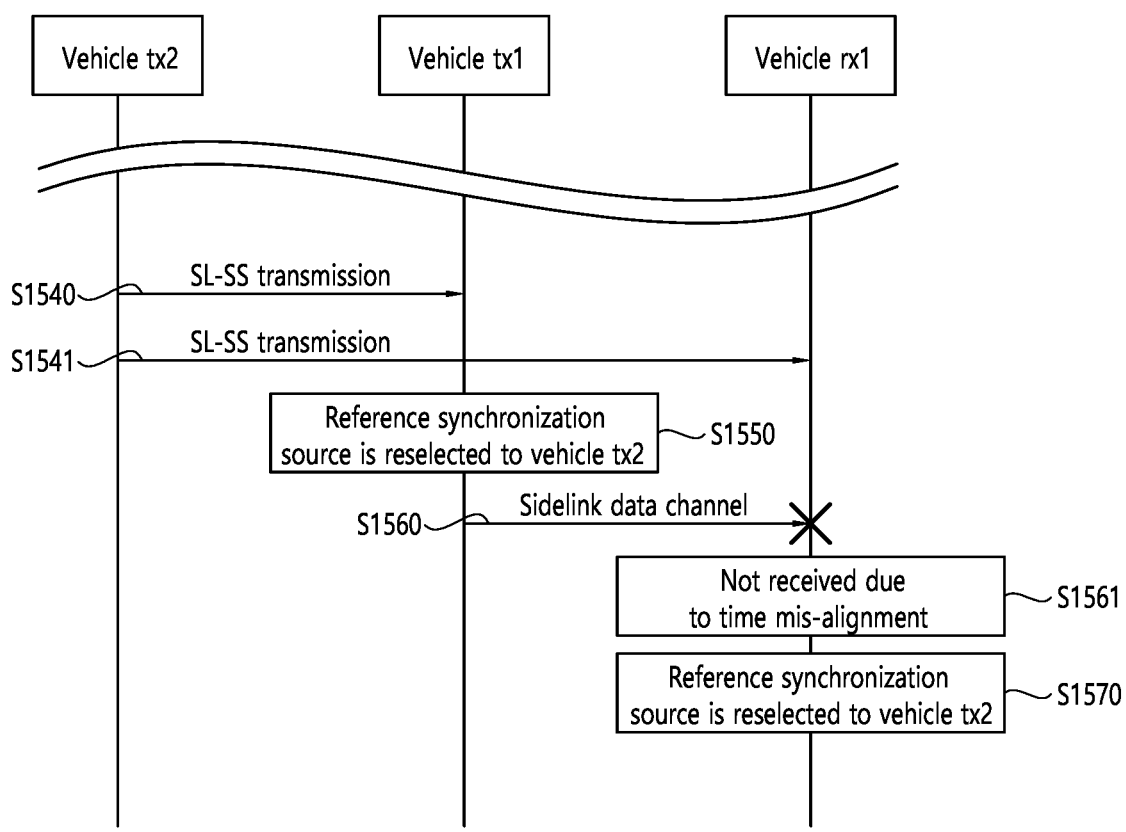
FIG. 15 shows another example of a case where V2X communication is interrupted when a reference synchronization source is reselected to which implementations of the present disclosure are applied.

FIG. 15 shows another example of a case where V2X communication is interrupted when a reference synchronization source is reselected to which implementations of the present disclosure are applied.

First, operations corresponding to steps S1400 through S1431 of FIG. 14 may be performed as steps S1500 through S1531 of FIG. 15.

In step S1540 and step S1541, vehicle tx2 appears and transmits SL-SS. It is assumed that vehicle tx2 can be a reference synchronization source with a higher priority than other vehicles (e.g., vehicle tx1). The SL-SS transmitted in step S1540 and step S1541 are received normally by vehicle tx1 and vehicle rx1, respectively.

In step S1550, vehicle tx1 reselects the reference synchronization source as vehicle tx2. Vehicle TX1 performs synchronization with vehicle TX2, whereby the timing of vehicle TX1 is aligned with respect to vehicle TX2.

However, it is assumed that this is still before vehicle rx1 reselects the reference synchronization source to vehicle tx2. That is, due to differences in the timing of SL-SS reception and/or processing time within the receiving end, etc., there may be differences in the timing of applying the new synchronization even between vehicles that normally receive SL-SS, which may cause them to be out of sync with each other.

In step S1560, vehicle tx1 transmits the SL data channel to vehicle rx1. The transmission of the SL data channel may be based on the changed timing.

In step S1561, due to a time misalignment between vehicle rx1 and vehicle tx1 (i.e., vehicle rx1 has not yet changed its reference synchronization source to vehicle tx2 and is therefore is not aware of the changed timing of vehicle tx1), vehicle rx1 is unable to receive the SL data channel transmitted by vehicle tx1.

In step S1570, vehicle rx1 reselects the reference synchronization source to vehicle tx2.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 16:
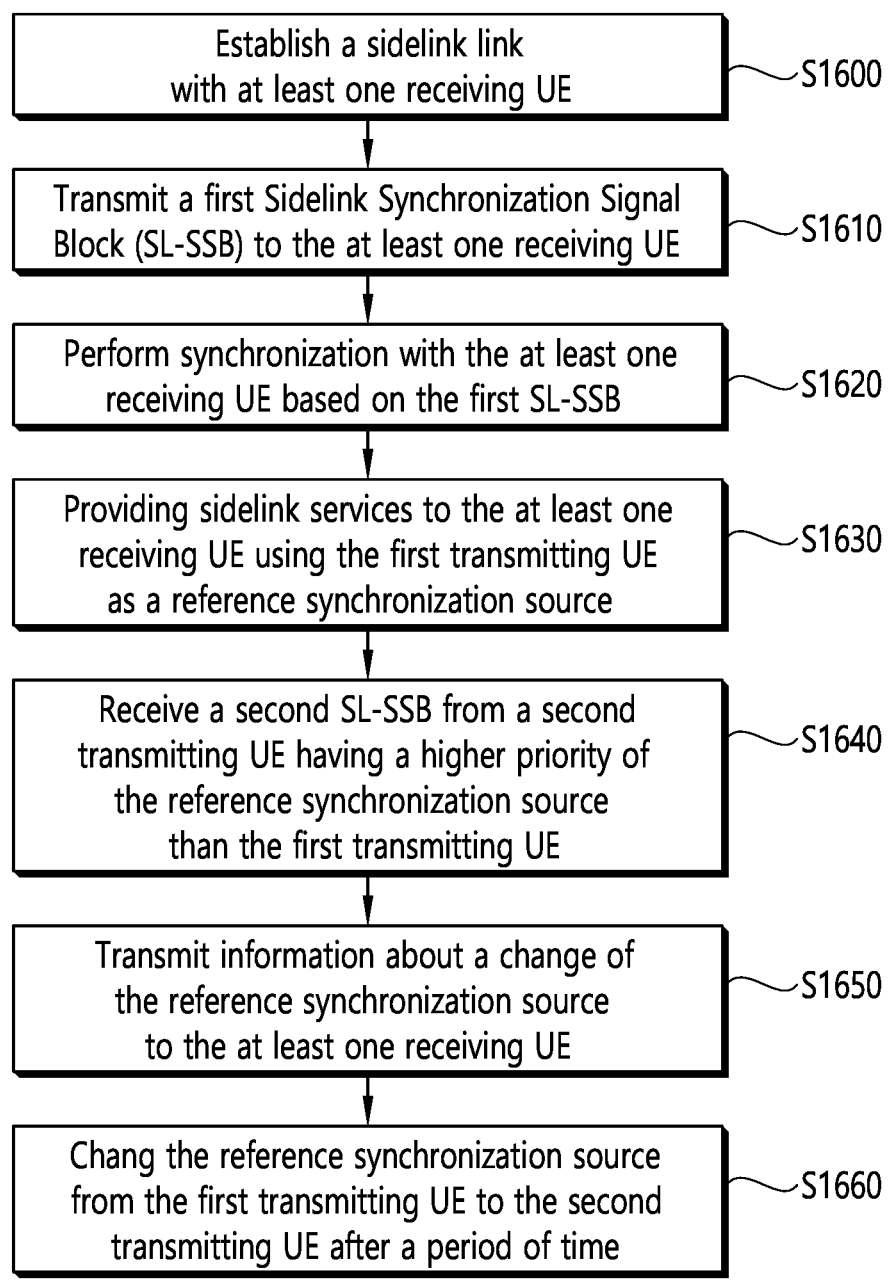
FIG. 16 shows an example of a method performed by a first transmitting UE to which implementations of the present disclosure are applied.

FIG. 16 shows an example of a method performed by a first transmitting UE to which implementations of the present disclosure are applied.

In step S1600, the method comprises establishing a Sidelink link with at least one receiving UE.

In step S1610, the method comprises transmitting a first SL-SSB to the at least one receiving UE.

In step S1620, the method comprises performing synchronization with the at least one receiving UE based on the first SL-SSB.

In step S1630, the method comprises providing SL services to the at least one receiving UE using the first transmitting UE as a reference synchronization source.

In step S1640, the method comprises receiving a second SL-SSB from a second transmitting UE having a higher priority of the reference synchronization source than the first transmitting UE.

In step S1650, the method comprises transmitting information about a change of the reference synchronization source to the at least one receiving UE.

In step S1660, the method comprises changing the reference synchronization source from the first transmitting UE to the second transmitting UE after a period of time.

In some implementations, the information about the change of the reference synchronization source may comprise a timing offset before and after the change of the reference synchronization source. The timing offset may comprise at least one of an SFN offset, a slot offset, a symbol offset, and/or a sample offset. The timing offset may be expressed in sample units. The timing offset may be a timing offset of SFN 0 or slot index 0.

In some implementations, the information about the change of the reference synchronization source may comprise information about a reference synchronization source activation time informing when the change of the reference synchronization source takes effect. The reference synchronization source activation time may correspond to the period of time.

In some implementations, the information about the change of the reference synchronization source may comprise information about the second transmitting UE. Also, the information about the change of the reference synchronization source may comprise an ID of the second SL-SSB.

In some implementations, the first transmitting UE is in communication with at least one of a mobile device, a network, and/or autonomous vehicles other than the first transmitting UE.

Furthermore, the method in perspective of the first transmitting UE described above in FIG. 16 may be performed by the first wireless device 100 shown in FIG. 2, the wireless device 100 shown in FIG. 3, and/or the UE 100 shown in FIG. 4.

More specifically, the first transmitting UE comprises at least one transceiver, at least one processor, and at least one memory operably connectable to the at least one processor. The at least one memory stores instructions that, based on being executed by the at least one processor, perform operations below.

The first transmitting UE establishes a Sidelink link with at least one receiving UE.

The first transmitting UE transmits a first SL-SSB to the at least one receiving UE via the at least one transceiver.

The first transmitting UE performs synchronization with the at least one receiving UE based on the first SL-SSB.

The first transmitting UE provides SL services to the at least one receiving UE using the first transmitting UE as a reference synchronization source via the at least one transceiver.

The first transmitting UE receives a second SL-SSB from a second transmitting UE having a higher priority of the reference synchronization source than the first transmitting UE via the at least one transceiver.

The first transmitting UE transmits information about a change of the reference synchronization source to the at least one receiving UE via the at least one transceiver.

The first transmitting UE changes the reference synchronization source from the first transmitting UE to the second transmitting UE after a period of time.

In some implementations, the information about the change of the reference synchronization source may comprise a timing offset before and after the change of the reference synchronization source. The timing offset may comprise at least one of an SFN offset, a slot offset, a symbol offset, and/or a sample offset. The timing offset may be expressed in sample units. The timing offset may be a timing offset of SFN 0 or slot index 0.

In some implementations, the information about the change of the reference synchronization source may comprise information about a reference synchronization source activation time informing when the change of the reference synchronization source takes effect. The reference synchronization source activation time may correspond to the period of time.

In some implementations, the information about the change of the reference synchronization source may comprise information about the second transmitting UE. Also, the information about the change of the reference synchronization source may comprise an ID of the second SL-SSB.

Furthermore, the method in perspective of the first transmitting UE described above in FIG. 16 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus operating in a wireless communication system comprises at least one processor, and at least one memory operably connectable to the at least one processor. The at least one processor is adapted to perform operations comprising: performing synchronization with at least one receiving UE based on a first SL-SSB, obtaining a second SL-SSB from a UE having a higher priority of a reference synchronization source, generating information about a change of the reference synchronization source, and changing the reference synchronization source after a period of time.

Furthermore, the method in perspective of the first transmitting UE described above in FIG. 16 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: performing synchronization with at least one receiving UE based on a first SL-SSB, obtaining a second SL-SSB from a UE having a higher priority of a reference synchronization source, generating information about a change of the reference synchronization source, and changing the reference synchronization source after a period of time.

Figure 17:
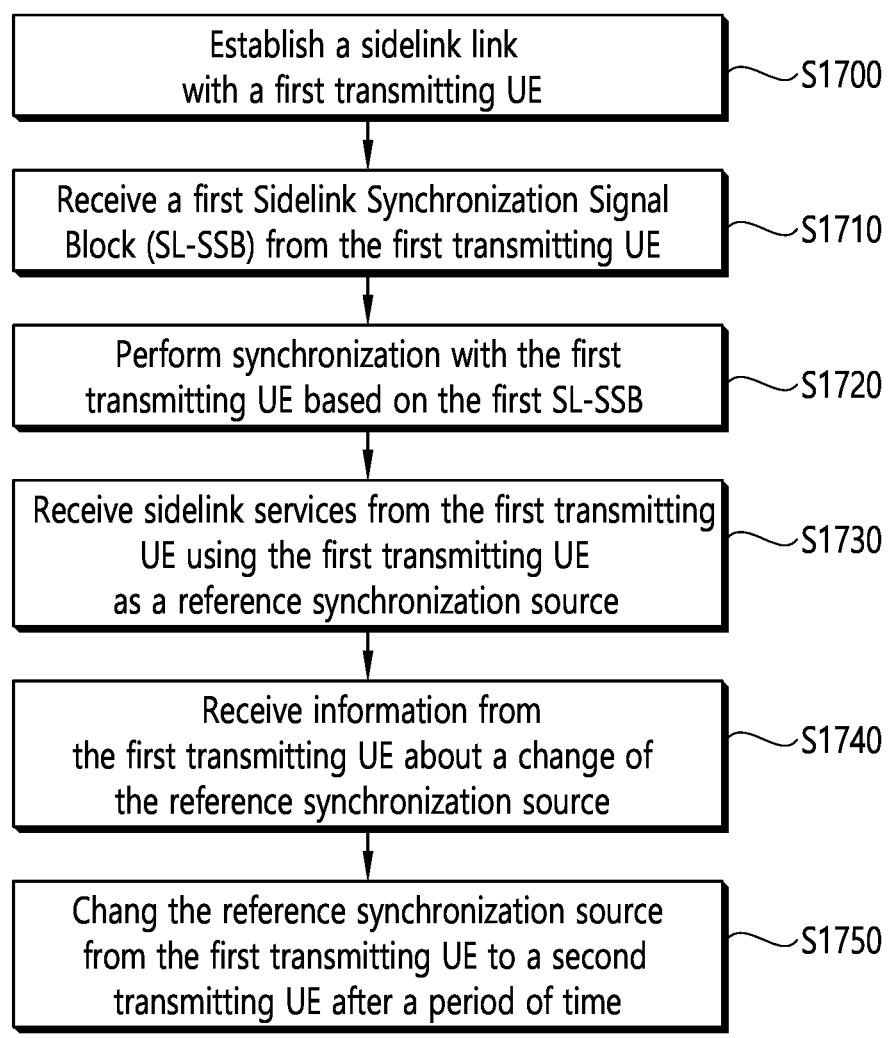
FIG. 17 shows an example of a method performed by a receiving UE to which implementations of the present disclosure are applied.

FIG. 17 shows an example of a method performed by a receiving UE to which implementations of the present disclosure are applied.

In step S1700, the method comprises establishing a sidelink link with a first transmitting UE.

In step S1710, the method comprises receiving a first SL-SSB from the first transmitting UE.

In step S1720, the method comprises performing synchronization with the first transmitting UE based on the first SL-SSB.

In step S1730, the method comprises receiving sidelink services from the first transmitting UE using the first transmitting UE as a reference synchronization source.

In step S1740, the method comprises receiving information from the first transmitting UE about a change of the reference synchronization source.

In step S1750, the method comprises changing the reference synchronization source from the first transmitting UE to a second transmitting UE after a period of time.

In some implementations, the information about the change of the reference synchronization source may comprise a timing offset before and after the change of the reference synchronization source. A Fast Fourier Transform (FFT) boundary may be configured based on a timing with the first transmitting UE as the reference synchronization source and the timing offset. The receiving UE may be provided with broadcast services from the first transmitting UE within the FFT boundary. The timing offset may comprise at least one of an SFN offset, a slot offset, a symbol offset, and/or a sample offset. The timing offset may be expressed in sample units. The timing offset may be a timing offset of SFN 0 or slot index 0.

In some implementations, the information about the change of the reference synchronization source may comprise information about a reference synchronization source activation time informing when the change of the reference synchronization source takes effect. The reference synchronization source activation time may correspond to the period of time.

In some implementations, the information about the change of the reference synchronization source may comprise information about the second transmitting UE. Also, the information about the change of the reference synchronization source may comprise an ID of the second SL-SSB.

Furthermore, the method in perspective of the receiving UE described above in FIG. 17 may be performed by the second wireless device 200 shown in FIG. 2, the wireless device 100 shown in FIG. 3, and/or the UE 100 shown in FIG. 4.

More specifically, the receiving UE comprises at least one transceiver, at least one processor, and at least one memory operably connectable to the at least one processor. The at least one memory stores instructions that, based on being executed by the at least one processor, perform operations below.

The receiving UE establishes a sidelink link with a first transmitting UE.

The receiving UE receives a first SL-SSB from the first transmitting UE via the at least one transceiver.

The receiving UE performs synchronization with the first transmitting UE based on the first SL-SSB.

The receiving UE receives sidelink services from the first transmitting UE using the first transmitting UE as a reference synchronization source via the at least one transceiver.

The receiving UE receives information from the first transmitting UE about a change of the reference synchronization source via the at least one transceiver.

The receiving UE changes the reference synchronization source from the first transmitting UE to a second transmitting UE after a period of time.

In some implementations, the information about the change of the reference synchronization source may comprise a timing offset before and after the change of the reference synchronization source. A Fast Fourier Transform (FFT) boundary may be configured based on a timing with the first transmitting UE as the reference synchronization source and the timing offset. The receiving UE may be provided with broadcast services from the first transmitting UE within the FFT boundary. The timing offset may comprise at least one of an SFN offset, a slot offset, a symbol offset, and/or a sample offset. The timing offset may be expressed in sample units. The timing offset may be a timing offset of SFN 0 or slot index 0.

In some implementations, the information about the change of the reference synchronization source may comprise information about a reference synchronization source activation time informing when the change of the reference synchronization source takes effect. The reference synchronization source activation time may correspond to the period of time.

In some implementations, the information about the change of the reference synchronization source may comprise information about the second transmitting UE. Also, the information about the change of the reference synchronization source may comprise an ID of the second SL-SSB.

Furthermore, the method in perspective of the receiving UE described above in FIG. 17 may be performed by control of the processor 202 included in the second wireless device 200 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus operating in a wireless communication system comprises at least one processor, and at least one memory operably connectable to the at least one processor. The at least one processor is adapted to perform operations comprising: obtaining a first SL-SSB, performing synchronization based on the first SL-SSB, obtaining information about a change of a reference synchronization source, and changing the reference synchronization source after a period of time.

Furthermore, the method in perspective of the receiving UE described above in FIG. 17 may be performed by a software code 205 stored in the memory 204 included in the second wireless device 200 shown in FIG. 2.

More specifically, at least one CRM stores instructions that, based on being executed by at least one processor, perform operations comprising: obtaining a first SL-SSB, performing synchronization based on the first SL-SSB, obtaining information about a change of a reference synchronization source, and changing the reference synchronization source after a period of time.

Hereinafter, various implementations of the present disclosure are described.

1. First Implementation

According to the first implementation of the present disclosure, in order to solve the problem of communication disconnection that may occur when a reference synchronization source is changed while V2X communication using SL is in progress, a method may be provided in which a transmitting UE and receiving UEs engaged in V2X communication can be synchronized with a new reference synchronization source simultaneously by providing timing information of a reference synchronization source that is scheduled to be changed and a time of application of such timer information to a nearby UEs provided with V2X service.

According to the first implementation of the present disclosure, when a vehicle (e.g., vehicle tx1) currently providing V2X services with itself as the reference synchronization source wishes to change the reference synchronization source to another vehicle (e.g., vehicle tx2), information about the change of reference synchronization source may be informed to other vehicles to which it is providing V2X services. That is, the information about the change of reference synchronization source may be informed by a UE currently providing V2X services that want to use it after selecting a new reference synchronization source.

The information about the change of the reference synchronization source may include the timing offset before the change and after the change. The timing offset may comprise at least one of a frame offset, a slot offset, a symbol offset, and/or a sample offset. The timing offset may be expressed in units of samples. For example, the timing offset may be a sample-by-sample representation of the timing offset of SFN 0 and/or the timing offset of slot 0 before and after the change of the reference synchronization source. Table 5 shows the number of slots per frame, the number of samples per slot, and the number of samples per frame according to the subcarrier spacing.

TABLE 5

| SCS (kHz) | Number of frames per slot | Number of samples per slot (Tc) | Number of samples per frame (Tc) |
|---|---|---|---|
| 15 | 10 | 131072 | 1310720 |
| 30 | 20 | 131072 | 2621440 |
| 60 | 40 | 131072 | 5242880 |
| 120 | 80 | 131072 | 10485760 |
| 240 | 160 | 131072 | 20971520 |

The information about the change of the reference synchronization source may include a reference synchronization source activation time informing when to apply the new reference synchronization source. The transmitting UE (e.g., vehicle tx1) and the receiving UE may simultaneously change the reference synchronization source at the time informed by the reference synchronization source activation time. This may reduce ambiguity about the timing of synchronization between the UEs applying the change of reference synchronization source.

Further, according to the change of the reference synchronization source, each UE may update its SFN information to reduce ambiguity about the resource pool utilizing the bitmap of the resource pool.

Figure 18:
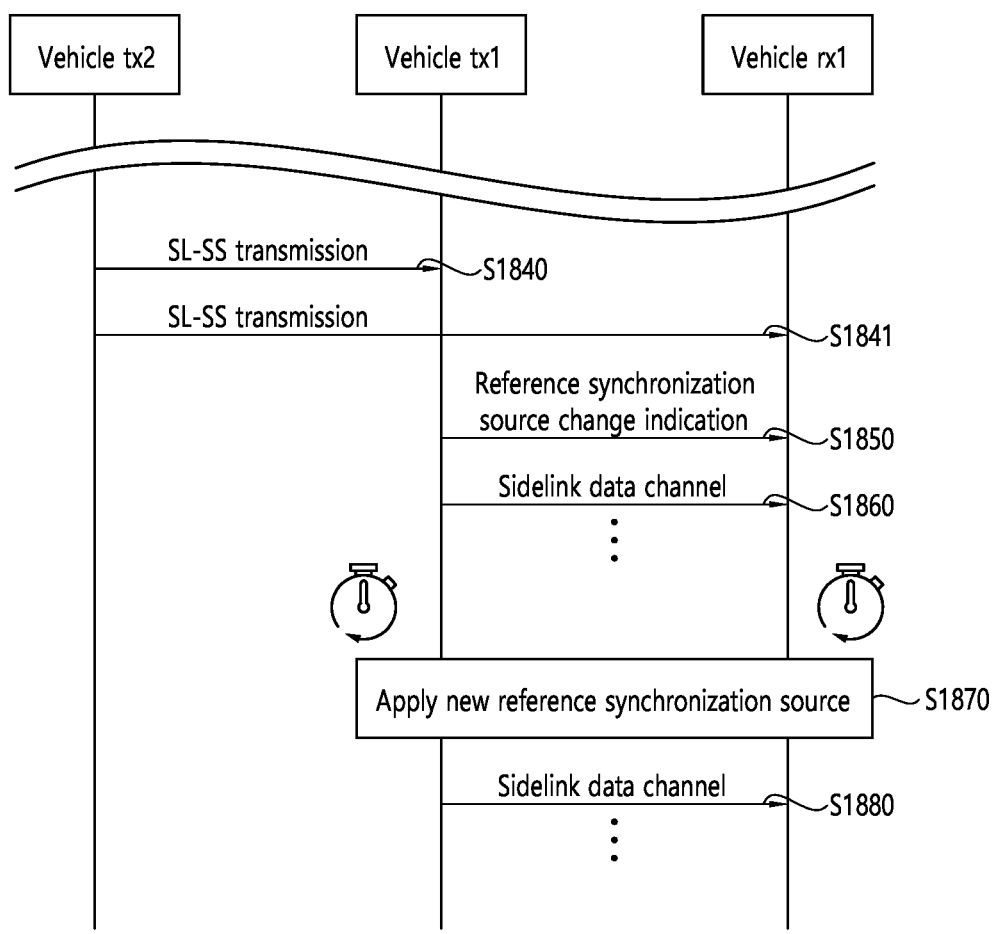
FIG. 18 shows an example of informing a change of a reference synchronization source to which the first implementation of the present disclosure is applied.

FIG. 18 shows an example of informing a change of a reference synchronization source to which the first implementation of the present disclosure is applied.

First, operations corresponding to steps S1400 through S1431 of FIG. 14 may be performed as steps S1800 through S1831 of FIG. 18.

In step S1840 and step S1841, vehicle tx2 appears and transmits the SL-SS. It is assumed that vehicle tx2 can be a reference synchronization source with a higher priority than other vehicles (e.g., vehicle tx1). The SL-SS transmitted in step S1540 and step S1541 may be received normally by vehicle tx1 and vehicle rx1, respectively. Alternatively, the SL-SS transmitted in step S1540 may be successfully received by vehicle tx1, but the SL-SS transmitted in step S1541 may not be successfully received by rx1 due to issues such as vehicle blocking.

In step S1850, vehicle tx1 transmits a reference synchronization source change indication to vehicle rx1. That is, when a change of the reference synchronization source is triggered, vehicle tx1, which is currently providing V2X services as the reference synchronization source, does not immediately change the reference synchronization source, but maintains the existing reference synchronization source and transmits the reference synchronization source change indication to the neighboring vehicles for which it was providing V2X services.

As described above, the reference synchronization source change indication may include a timing offset before the change and after the change. The timing offset may include at least one of a frame offset, a slot offset, a symbol offset, and/or a sample offset. The timing offset may be expressed in units of samples. For example, the timing offset may be a sample-by-sample representation of the timing offset of SFN 0 and/or the timing offset of slot 0 before and after the change of the reference synchronization source. Accordingly, in addition to physical synchronization, logical synchronization used for resource pool determination may also be considered.

Further, the reference synchronization source change indication may include a reference synchronization source activation time informing when to apply the new reference synchronization source. The reference synchronization source activation time may inform an absolute time timing. Alternatively, the reference synchronization source activation time may inform a relative timing (i.e., an offset) from the currently used timing.

In step S1860, vehicle tx1 transmits the SL data channel to vehicle rx1. The transmission of the SL data channel may be based on the timing before the reference synchronization source change. That is, the existing reference synchronization source is maintained until the new reference synchronization source is applied.

At the reference synchronization source activation time, in step S1870, vehicle tx1 and vehicle rx1 (and all vehicles/UEs participating in the V2X service) change the reference synchronization source to vehicle tx2 and synchronize to vehicle tx2.

In step S1880, vehicle tx1 transmits the SL data channel to vehicle rx1. The transmission of the SL data channel may be based on the changed timing.

According to the first implementation of the present disclosure, communication disconnection issues that can occur due to a change of the reference synchronization source can be minimized.

2. Second Implementation

Figure 19:
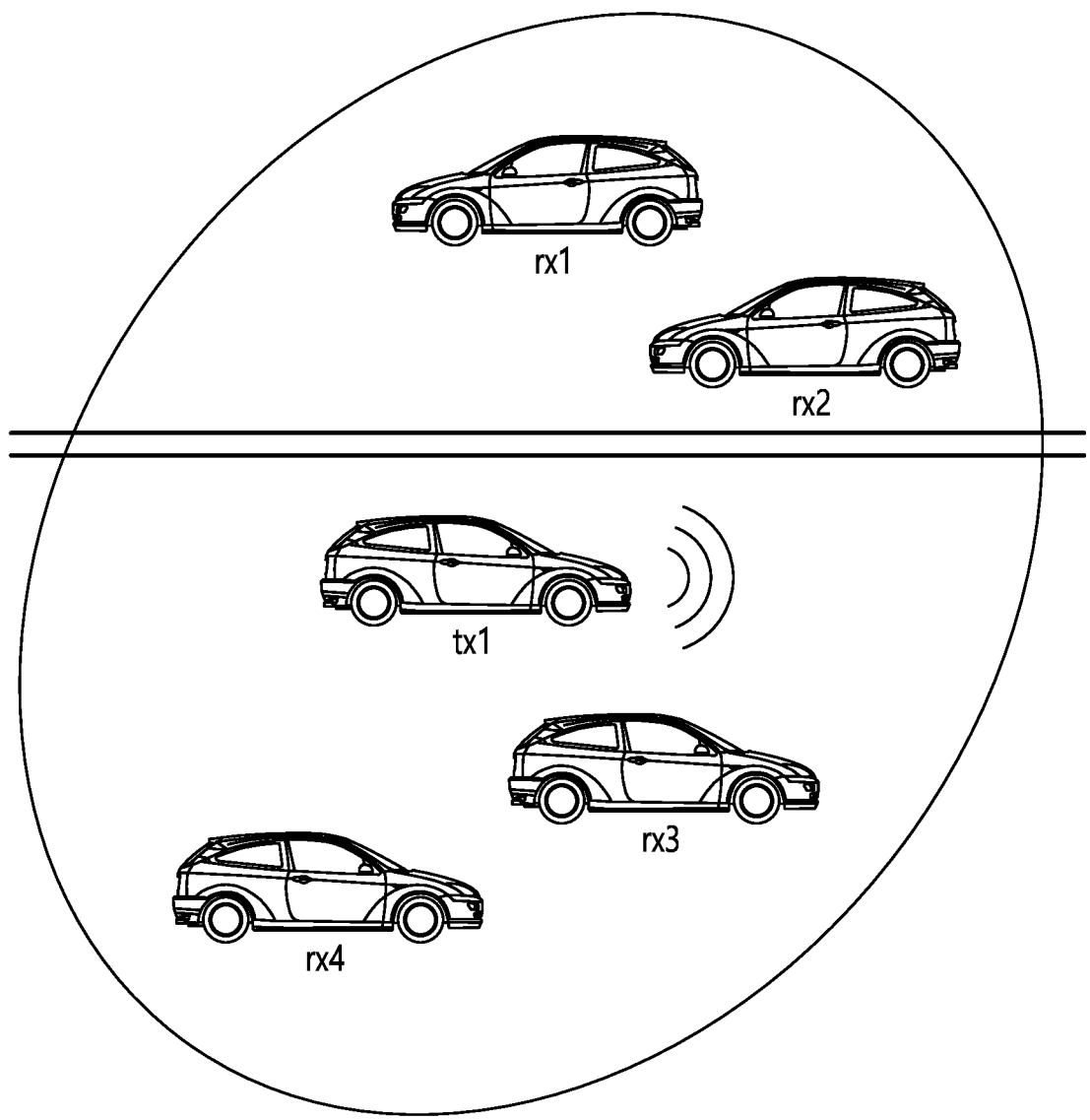
FIG. 19 shows an example of a vehicle cluster performing V2X communication to which the second implementation of the present disclosure is applied.

FIG. 19 shows an example of a vehicle cluster performing V2X communication to which the second implementation of the present disclosure is applied.

Referring to FIG. 19, vehicle tx1 provides V2X services to neighboring vehicles while acting as a reference synchronization source for V2X communication. That is, the timing of V2X communication with neighboring vehicles may be aligned with respect to the timing of vehicle tx1. Vehicle tx1 may provide unicast/groupcast/broadcast services to vehicles in a relatively short distance (e.g., vehicles rx2, rx3). Vehicle tx1 may provide broadcast services to vehicles that are relatively far apart (e.g., vehicles rx1, rx4).

Figure 20:
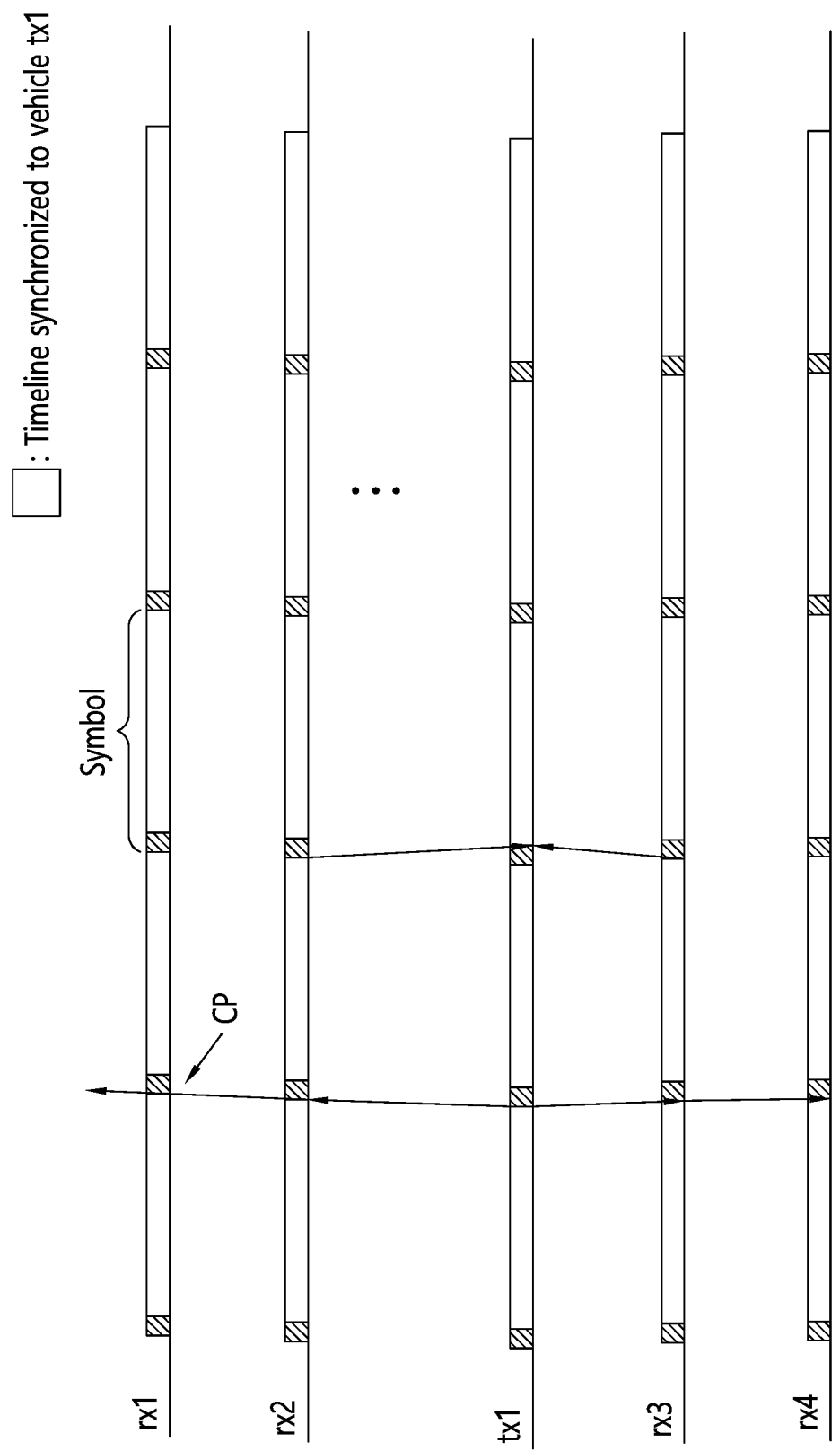
FIG. 20 shows an example of timing of V2X communication to which the second implementation of the present disclosure is applied.

FIG. 20 shows an example of timing of V2X communication to which the second implementation of the present disclosure is applied.

FIG. 20 shows timing for V2X communication of the vehicle cluster shown in FIG. 19. Vehicle tx1 acts as the reference synchronization source for the V2X communication, and the neighboring vehicles (i.e., vehicles rx1, rx2, rx3, rx4) receive SL-SSBs from vehicle tx1 to time-synchronize with vehicle tx1.

Figure 21:
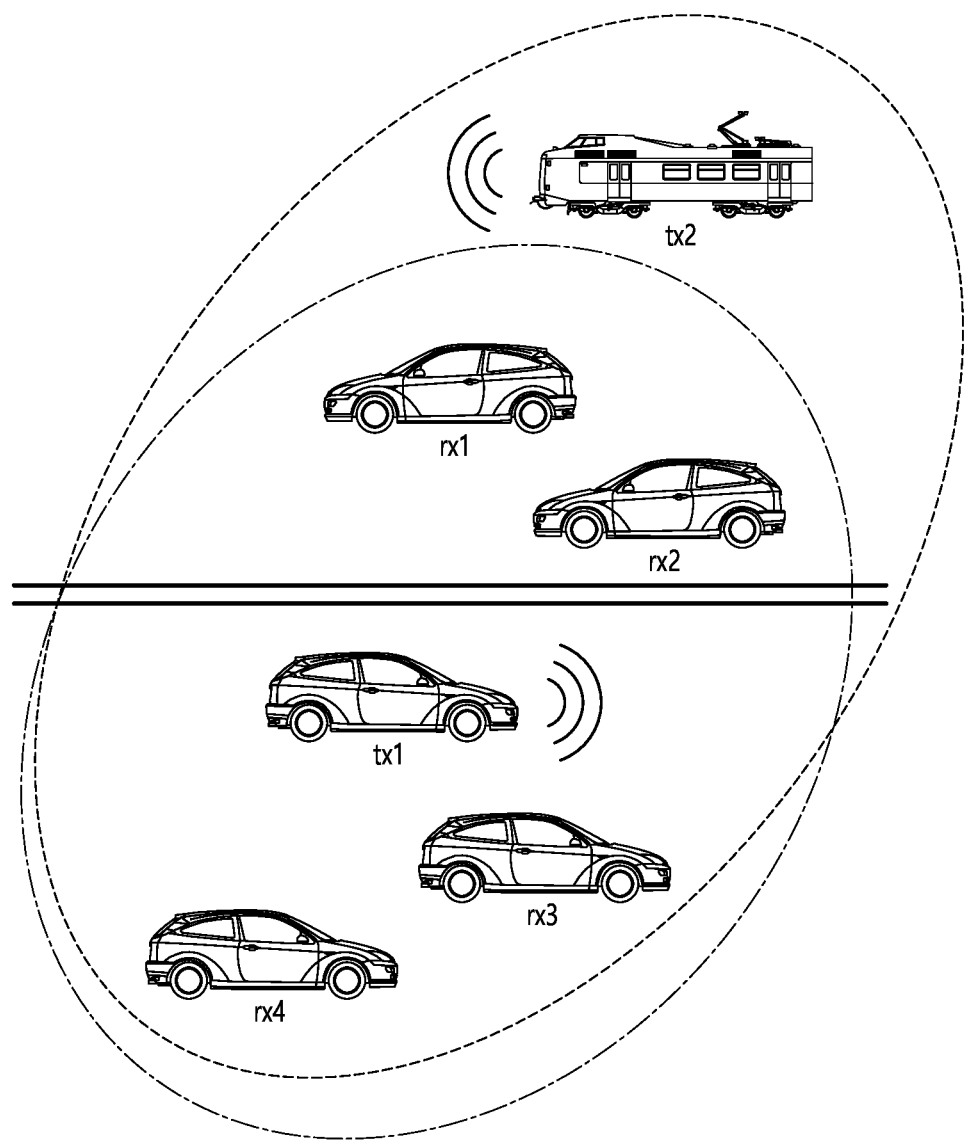
FIG. 21 shows another example of a vehicle cluster performing V2X communication to which the second implementation of the present disclosure is applied.

FIG. 21 shows another example of a vehicle cluster performing V2X communication to which the second implementation of the present disclosure is applied.

Referring to FIG. 21, while vehicle tx1 is providing V2X services to neighboring vehicles while acting as a reference synchronization source for V2X communications, vehicle tx2 enters the vehicle cluster. If vehicle tx2 has a higher priority of reference synchronization source than vehicle tx1, vehicle tx2 may become the new reference synchronization source. The neighboring vehicles within the vehicle cluster containing vehicle tx1 may receive SL-SSBs from vehicle tx2 to time-synchronize with vehicle tx2.

After the reference synchronization source changes from vehicle tx1 to vehicle tx2, vehicle tx1 may continue to provide V2X services to the neighboring vehicles. For example, vehicle tx1 may provide unicast/groupcast/broadcast services to vehicles rx2, rx3. For example, vehicle tx1 may provide broadcast services to vehicle rx4.

Figure 22:
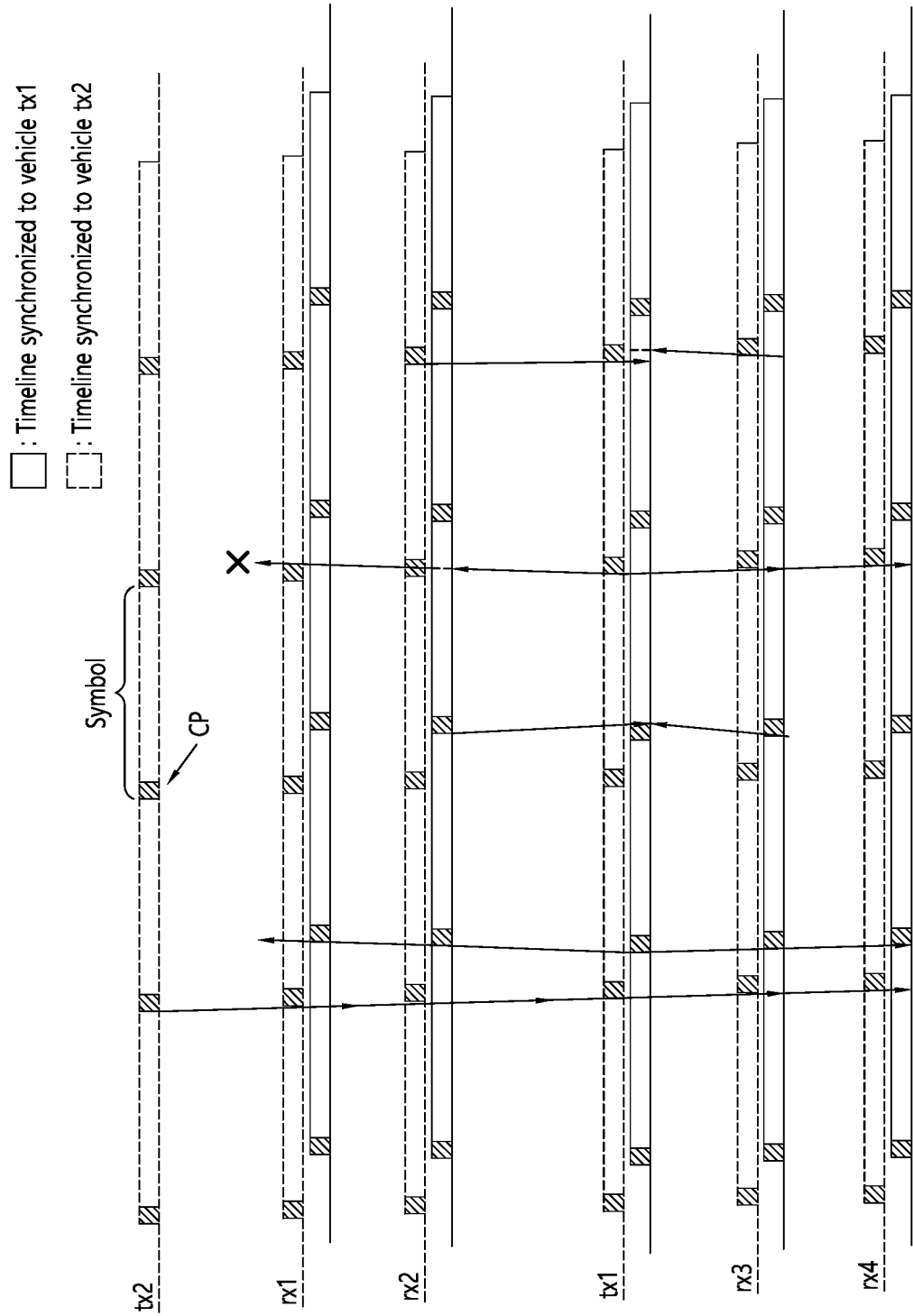
FIG. 22 shows an example of timing of V2X communication before and after a change of a reference synchronization source to which the second implementation of the present disclosure is applied.

FIG. 22 shows an example of timing of V2X communication before and after a change of a reference synchronization source to which the second implementation of the present disclosure is applied.

FIG. 22 shows timing for V2X communication of the vehicle cluster shown in FIG. 21. While vehicle tx1 is providing V2X services while acting as the reference synchronization source for V2X communication, vehicle tx2 with a higher priority appears and the reference synchronization source changes to vehicle tx2. The neighboring vehicles in the vehicle cluster including vehicle tx1 receive SL-SSBs from vehicle tx2 to time-synchronize with vehicle tx2.

In this case, when the reference synchronization source changes, depending on the distance from vehicle tx1 providing V2X services, signals for broadcast services may not arrive from vehicle tx1 within the CP boundary. For example, in FIG. 22, vehicle rx1 has a relatively large distance from vehicle tx1, so the signal for the broadcast services transmitted by vehicle tx1 cannot be received within the CP boundary. On the other hand, vehicle rx4 is relatively close to vehicle tx1, so the signal for the broadcast services transmitted by vehicle tx1 is received within the CP boundary.

If SL-SSB is transmitted from vehicle tx1, the broadcast services may be continued through background synchronization. However, an SL-SSB is not always transmitted from vehicle tx1. If vehicle tx1 does not initiate SL-SSB transmission, vehicle rx1 does not know when the signal from vehicle tx1 will arrive. In particular, in a numerology of 60 kHz or 120 kHz that may be used in the mmWave region, the CP length becomes shorter, which may narrow the scope of the broadcast services according to the problems described above.

According to the second implementation of the present disclosure, when a new reference synchronization source vehicle with a high priority appears within a vehicle cluster exchanging V2X services such as unicast/groupcast/broadcast via SL communication, a method may be provided to continue the service even after the change of the reference synchronization source in order to prevent the service of some vehicles in the cluster from being interrupted due to the change of the reference synchronization source.

According to the second implementation of the present disclosure, in order to ensure that the broadcast services are continued after a change of reference synchronization source, a vehicle or UE providing the broadcast services may, after obtaining a new reference synchronization source, measure the timing difference (e.g., symbol offset (To)) between the new reference synchronization source and the existing reference synchronization source in a unit of samples. Then, the measured timing difference (e.g., symbol offset (To)) between the new reference synchronization source and the existing reference synchronization source may be broadcast to neighboring vehicles or UEs.

In addition to the timing difference (e.g., symbol offset (To)) between the new reference synchronization source and the existing reference synchronization source, information (e.g., ID) about the vehicle or UE that becomes the new reference synchronization source may additionally be broadcast. In addition to the timing difference between the new reference synchronization source and the existing reference synchronization source (e.g., symbol offset (To)), information about the reference synchronization source activation time, which informs when the vehicle or UE performing the broadcast applies the timing of the new reference synchronization source, may additionally be broadcast. In addition to the timing difference (e.g., symbol offset (To)) between the new reference synchronization source and the existing reference synchronization source, the SL-SSID of the SL-SS transmitted by the new reference synchronization source applied by the vehicle or UE performing the broadcast may be additionally broadcast.

The timing difference (e.g., symbol offset (To)) between the new reference synchronization source and the existing reference synchronization source and other information describe above may be transmitted via a control message or a MAC Control Element (CE) for the broadcast services, etc.

According to the second implementation of the present disclosure, a vehicle or UE that has received the timing difference between the new reference synchronization source and the existing reference synchronization source as described above may configure the FFT boundary at a location that is at least as far away as the received timing difference (e.g., symbol offset (To)) relative to the existing timing. A vehicle or UE that has received the timing difference between the new reference synchronization source and the existing reference synchronization source may continue to receive broadcast services through the configured FFT boundary, even if it does not receive SL-SSB from the vehicle or UE providing the broadcast services.

According to the second implementation of the present disclosure, the transmitting/receiving vehicle or UE participating in the broadcast services may change to the timing of the new reference synchronization at a reference synchronization source activation time informing when to apply the new reference synchronization source.

Figure 23:
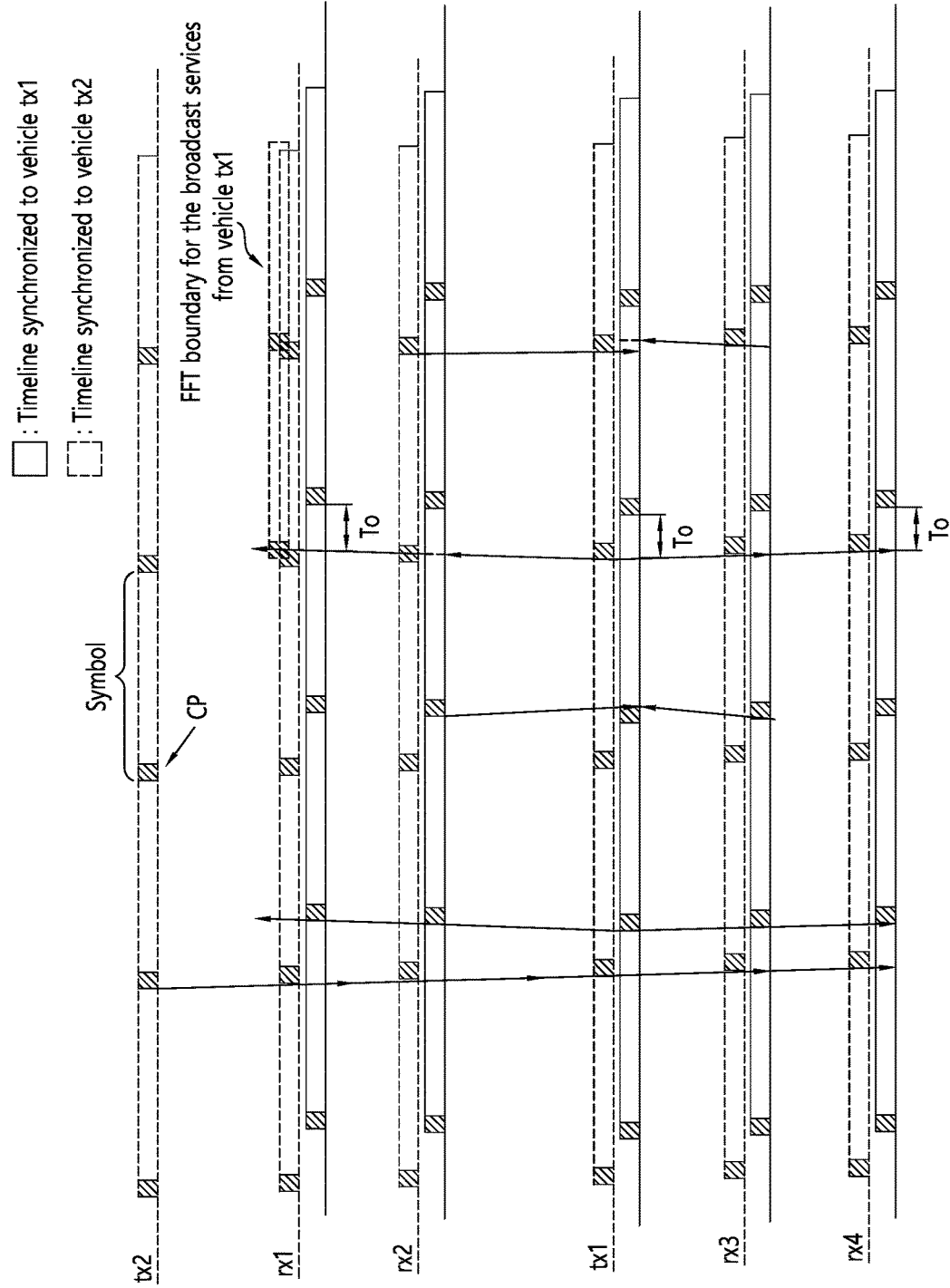
FIG. 23 shows an example in which a V2X service is continuously provided upon a change of a reference synchronization source to which the second implementation of the present disclosure is applied.

FIG. 23 shows an example in which a V2X service is continuously provided upon a change of a reference synchronization source to which the second implementation of the present disclosure is applied.

FIG. 23 shows an example where, at the timing shown in FIG. 22, vehicle rx1 continues to receive broadcast services by configuring an FFT boundary based on a symbol offset (To), according to the second implementation of the present disclosure. That is, vehicle tx1, which wishes to continue providing broadcast services to neighboring vehicles or UEs, may calculate the symbol offset (To) before and after the change of the reference synchronization source, and transmit the calculated symbol offset to the neighboring vehicles or UEs that were receiving broadcast services.

Vehicle rx1 may check that the corresponding symbol offset is the information calculated by vehicle tx1 that is providing the broadcast services. Furthermore, vehicle rx1 can check that the corresponding symbol offset corresponds to a timing difference with a recently changed reference synchronization source (i.e., vehicle tx2). Vehicle rx1 may apply the symbol offset to configure an FFT boundary and continue to receive the broadcast services within that FFT boundary. Even if vehicle rx1 does not receive SL-SSB, etc., from vehicle tx1 and cannot synchronize with vehicle tx1, vehicle rx1 may determine the reception timing to continue to receive the existing broadcast services.

Figure 24:
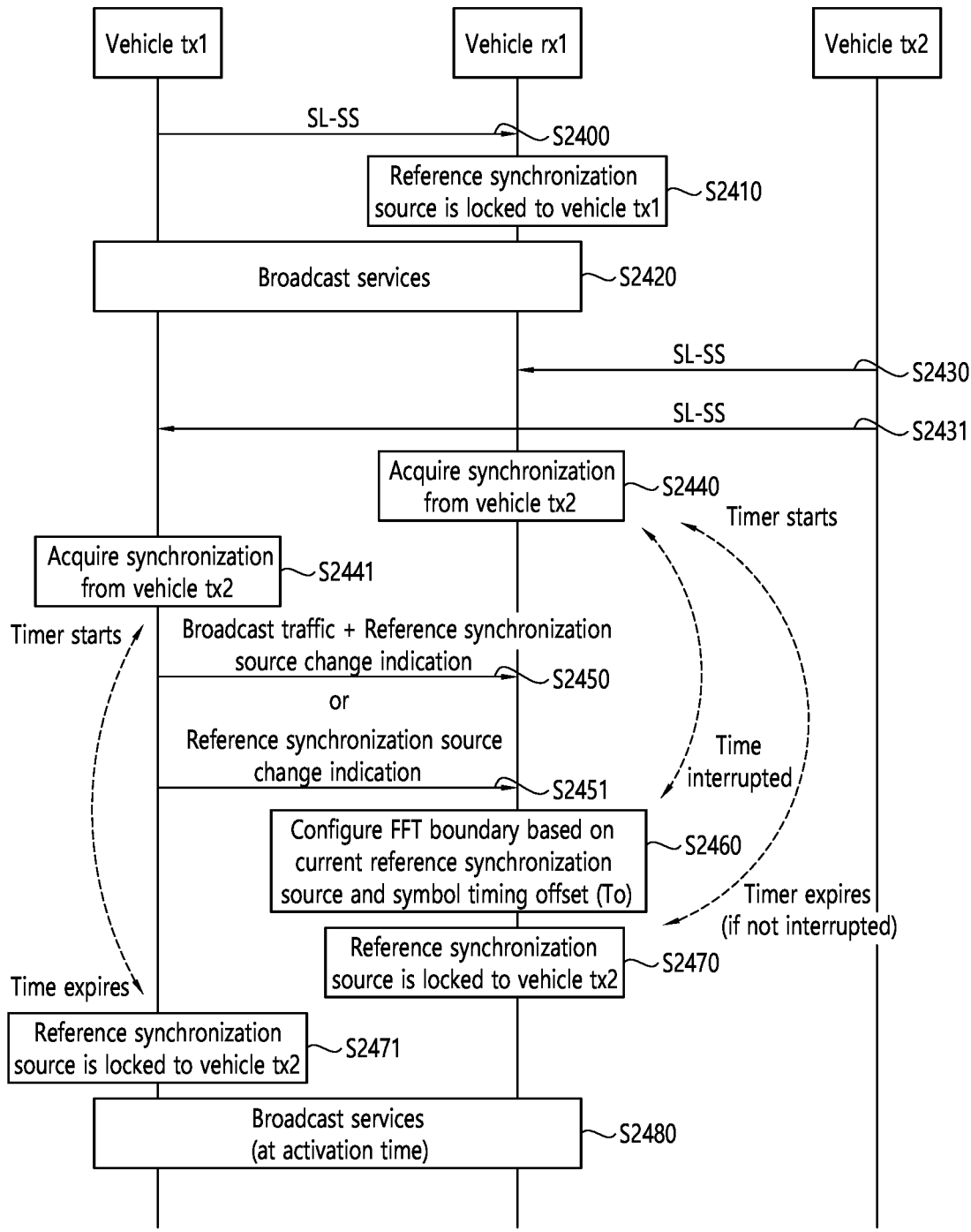
FIG. 24 shows an example of a procedure for ensuring that a V2X service is continuously provided upon a change of a reference synchronization source to which the second implementation of the present disclosure is applied.

FIG. 24 shows an example of a procedure for ensuring that a V2X service is continuously provided upon a change of a reference synchronization source to which the second implementation of the present disclosure is applied.

In step S2400, vehicle tx1 transmits an SL-SS.

In step S2410, upon receiving the SL-SS from vehicle tx1, vehicle rx1 locks the reference synchronization source to vehicle tx1. That is, the timing of the V2X communication between vehicle tx1 and vehicle rx1 is aligned with respect to vehicle tx1.

In step S2420, vehicle tx1 provides broadcast services to vehicle rx1.

In step S2430 and step S2431, vehicle tx2 appears and transmits SL-SS. It is assumed that vehicle tx2 can be a reference synchronization source with a higher priority than vehicle tx1.

In step S2440 and step S2441, vehicle rx1 and vehicle tx1 respectively acquire synchronization from vehicle tx2. In this case, a timer may be operated in vehicle rx1 and vehicle tx1, respectively. The values of the timers may be preconfigured.

In step S2450, vehicle tx1 may transmit broadcast traffic to vehicle rx1, together with a reference synchronization source change indication. Alternatively, in step S2451, vehicle tx1 may transmit a reference synchronization source change indication to vehicle rx1. The reference synchronization source change indication may be a control message or control data.

The reference synchronization source change indication may include a timing difference (e.g., a symbol offset (To)) between the new reference synchronization source and the existing reference synchronization source measured after vehicle tx1 acquires the synchronization from vehicle tx2. Further, the reference synchronization source change indication may include information (e.g., ID) about vehicle tx2 that becomes the new reference synchronization source. Further, the reference synchronization source change indication may include information about a reference synchronization source activation time that informs when vehicle tx1 applies the timing of the new reference synchronization source. Further, the reference synchronization source change indication may include the SL-SSID of the SL-SS transmitted by the new reference synchronization source, vehicle tx2.

In step S2460, vehicle rx1 configures the FFT boundary based on the current reference synchronization source and the received symbol offset (To). In this case, the running timer may be interrupted. Vehicle rx1 may continue to receive broadcast services from vehicle tx1 within that FFT boundary.

In step S2470, if the timer has expired without interruption, vehicle rx1 locks the reference synchronization source to vehicle tx2. In step S2471, if the timer has expired, vehicle tx1 locks the reference synchronization source to vehicle tx2.

In step S2480, vehicle tx1 provides the broadcast services to vehicle rx1 from the reference synchronization source activation time.

Figure 25:
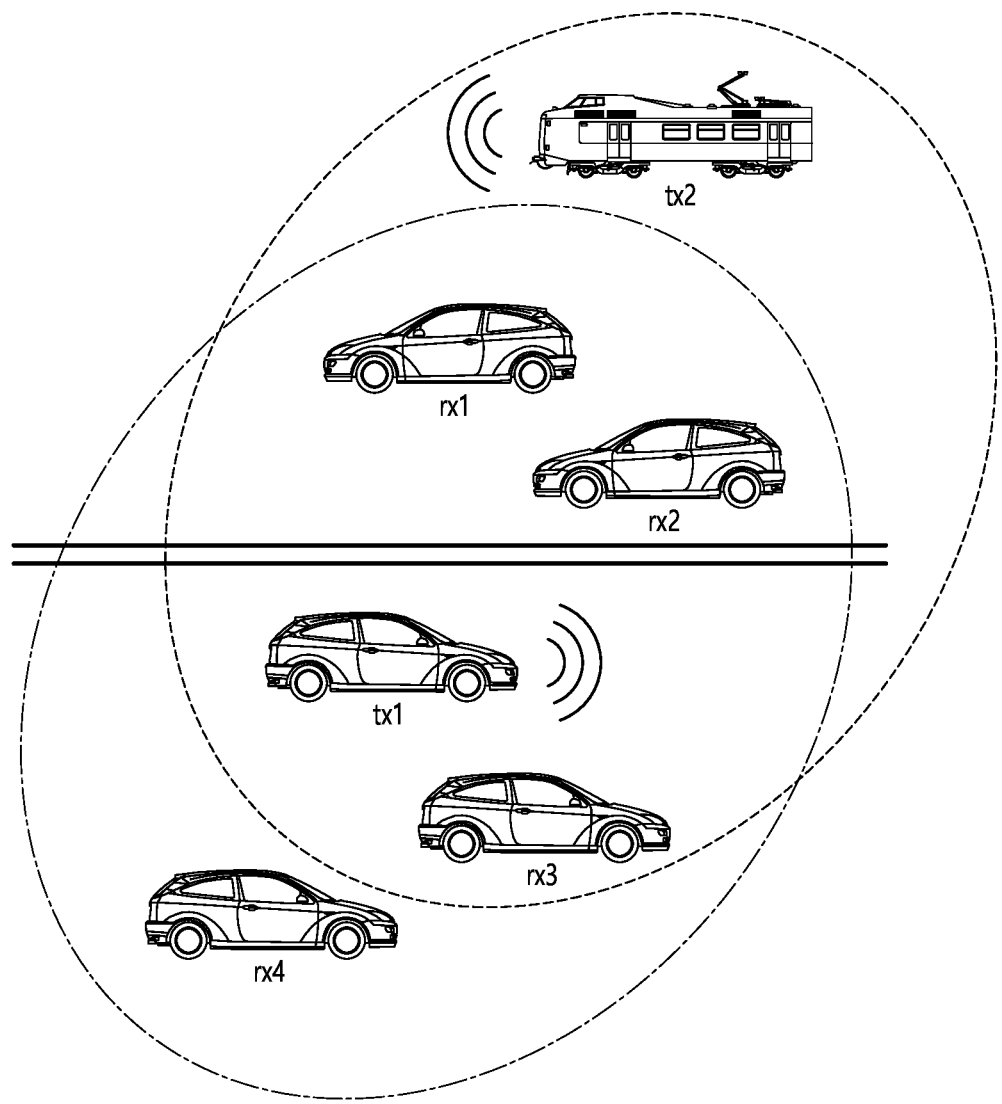
FIG. 25 shows another example of a vehicle cluster performing V2X communication to which the second implementation of the present disclosure is applied.

FIG. 25 shows another example of a vehicle cluster performing V2X communication to which the second implementation of the present disclosure is applied.

Referring to FIG. 25, while vehicle tx1 is acting as a reference synchronization source for V2X communications and providing V2X services to neighboring vehicles, vehicle tx2 enters the vehicle cluster. If vehicle tx2 has a higher priority of reference synchronization source than vehicle tx1, vehicle tx2 may become the new reference synchronization source. The neighboring vehicles within the vehicle cluster that includes vehicle tx1 may receive SL-SSB from vehicle tx2 to time-synchronize with vehicle tx2. However, vehicle rx4 is outside the coverage of vehicle tx2 and cannot receive a signal from vehicle tx2, so it may remain synchronized with vehicle tx1, which is the existing reference synchronization source.

After the reference synchronization source changes from vehicle tx1 to vehicle tx2, vehicle tx1 may continue to provide V2X services to neighboring vehicles. For example, vehicle tx1 may provide unicast/groupcast/broadcast services to vehicles rx2, rx3.

Figure 26:
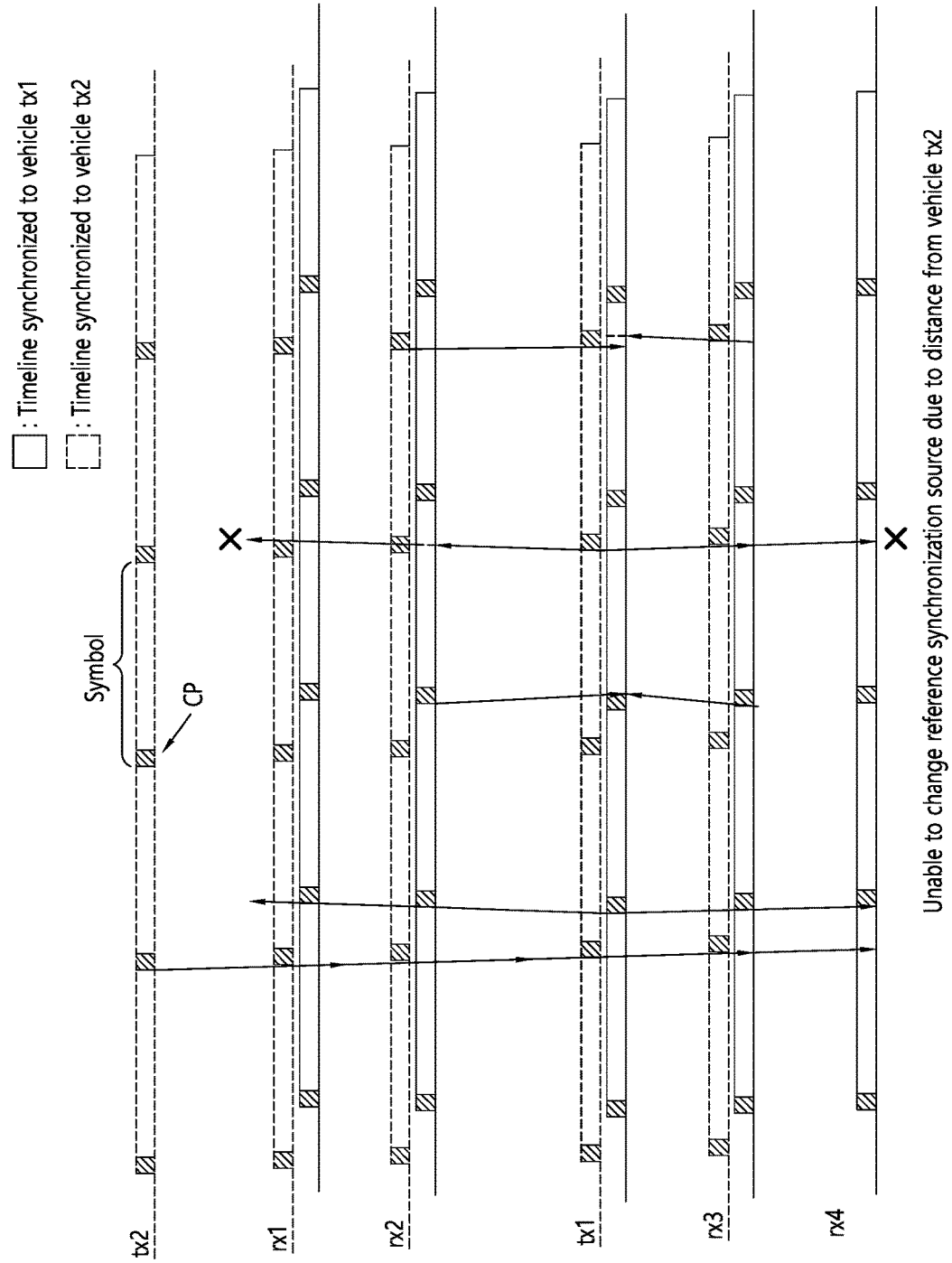
FIG. 26 shows another example of timing of V2X communication before and after a change of a reference synchronization source to which the second implementation of the present disclosure is applied.

FIG. 26 shows another example of timing of V2X communication before and after a change of a reference synchronization source to which the second implementation of the present disclosure is applied.

FIG. 26 shows timing for V2X communication of the vehicle cluster shown in FIG. 25. While vehicle tx1 is providing V2X services while acting as the reference synchronization source for V2X communications, vehicle tx2 with a higher priority appears and the reference synchronization source changes to vehicle tx2. The neighboring vehicles in the vehicle cluster including vehicle tx1 receive SL-SSB from vehicle tx2 to time-synchronize with vehicle tx2. However, vehicle rx4 does not receive the signal transmitted by vehicle tx2 due to its large distance from vehicle tx2, so it remains synchronized with vehicle tx1, which is the existing reference synchronization source.

In this case, as vehicle rx4 does not apply the changed reference synchronization source and maintains the existing reference synchronization source, it may not receive the signal for the broadcast services transmitted by vehicle tx1 according to the changed timing. That is, the timing of vehicle rx4 and the new timing of vehicle tx1 may not be aligned.

If SL-SSB is transmitted from vehicle tx1, the broadcast services may be continued through background synchronization. However, an SL-SSB is not always transmitted from vehicle tx1. If vehicle tx1 does not initiate SL-SSB transmission, vehicle rx1 does not know when the signal from vehicle tx1 will arrive. In particular, in a numerology of 60 kHz or 120 kHz that may be used in the mmWave region, the CP length becomes shorter, which may narrow the scope of the broadcast services according to the problems described above.

Figure 27:
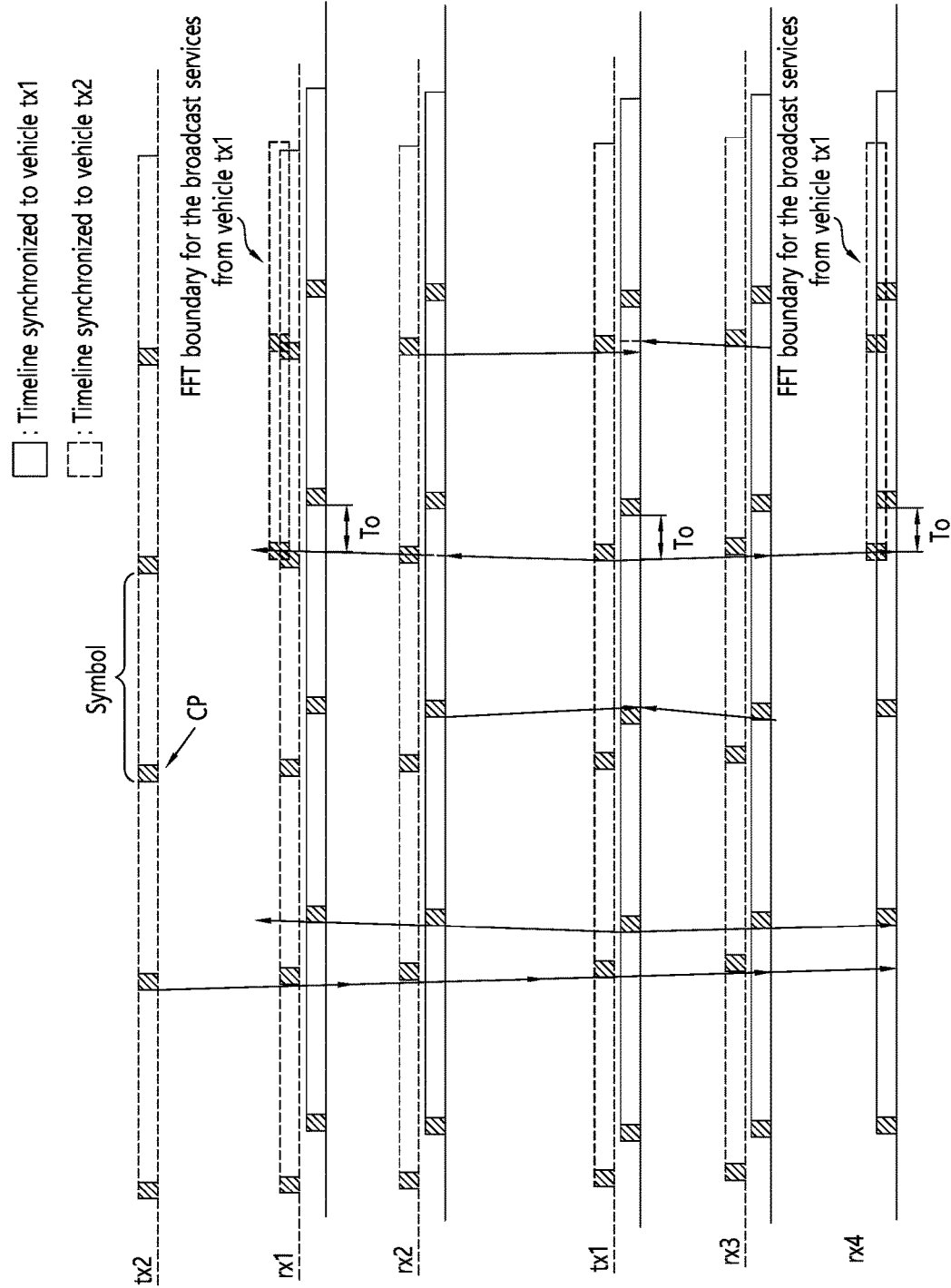
FIG. 27 shows another example in which a V2X service is continuously provided upon a change of a reference synchronization source to which the second implementation of the present disclosure is applied.

FIG. 27 shows another example in which a V2X service is continuously provided upon a change of a reference synchronization source to which the second implementation of the present disclosure is applied.

FIG. 27 shows an example where, at the timing shown in FIG. 26, vehicle rx1 is continuously provided with broadcast services by configuring an FFT boundary based on a symbol offset (To), according to the second implementation of the present disclosure. That is, vehicle tx1, which wishes to continue providing broadcast services to neighboring vehicles or UEs, may calculate the symbol offset (To) before and after the change of the reference synchronization source, and transmit the calculated symbol offset to the neighboring vehicles or UEs that were receiving broadcast services.

Vehicle rx4 may check that the corresponding symbol offset is the information calculated by vehicle tx1 that is providing the broadcast services. Furthermore, vehicle rx4 can check that the corresponding symbol offset corresponds to a timing difference with a recently changed reference synchronization source (i.e., vehicle tx2). Vehicle rx4 may apply the symbol offset to configure an FFT boundary and continue to receive the broadcast services within that FFT boundary. Even if vehicle rx4 does not receive SL-SSB, etc., from vehicle tx1 and cannot synchronize with vehicle tx1, vehicle rx4 may determine the reception timing to continue to receive the existing broadcast services.

Figure 28:
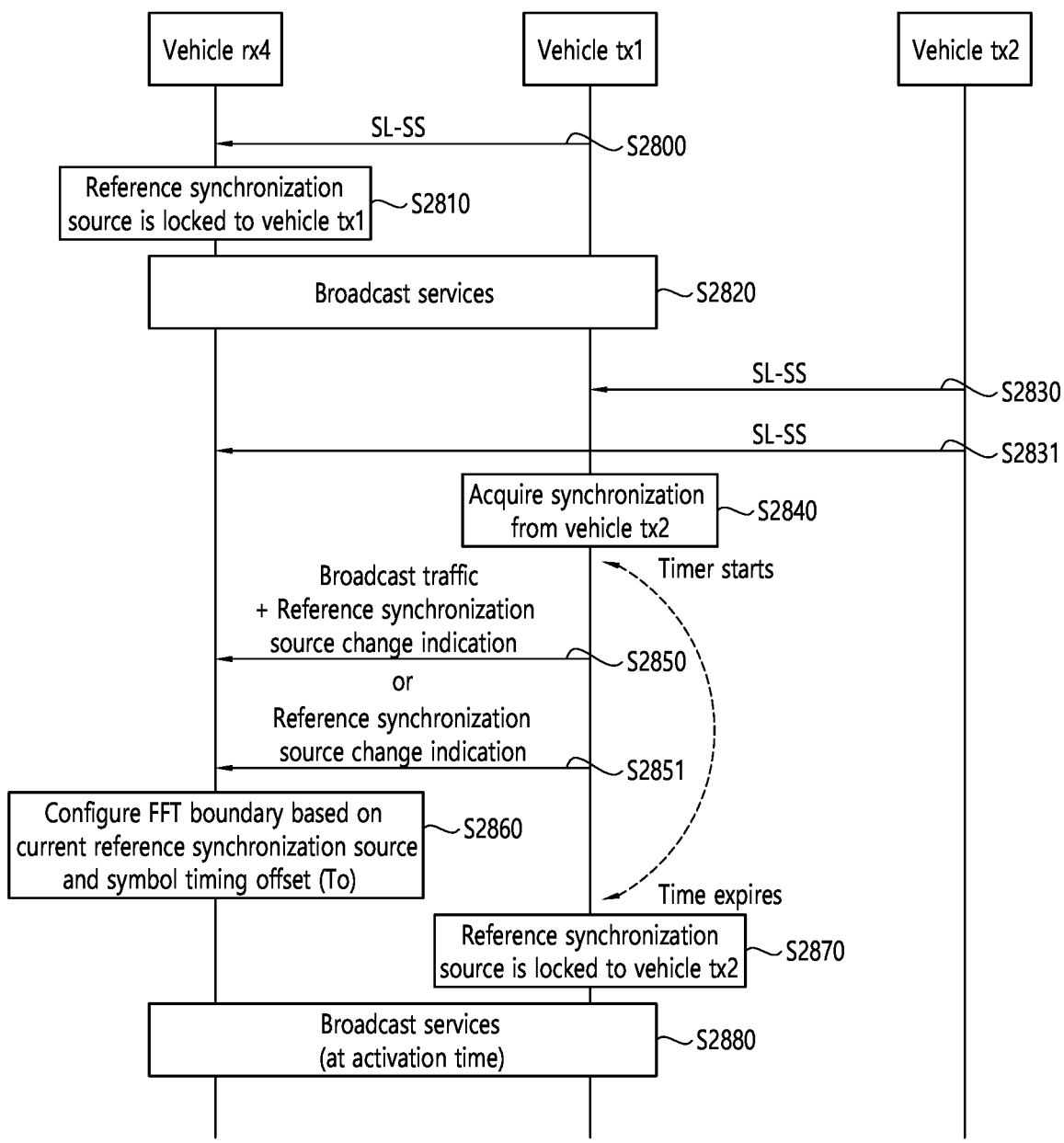
FIG. 28 shows another example of a procedure for ensuring that a V2X service is continuously provided upon a change of a reference synchronization source to which the second implementation of the present disclosure is applied.

FIG. 28 shows another example of a procedure for ensuring that a V2X service is continuously provided upon a change of a reference synchronization source to which the second implementation of the present disclosure is applied.

In step S2800, vehicle tx1 transmits SL-SS.

In step S2810, upon receiving the SL-SS from vehicle tx1, vehicle rx4 locks the reference synchronization source to vehicle tx1. That is, the timing of the V2X communication between vehicle tx1 and vehicle rx4 is aligned with respect to vehicle tx1.

In step S2820, vehicle tx1 provides broadcast services to vehicle rx4.

In step S2830 and step S2831, vehicle tx2 appears and transmits SL-SS. It is assumed that vehicle tx2 can be a reference synchronization source with a higher priority than vehicle tx1.

In step S2840, vehicle tx1 acquires synchronization from vehicle tx2. In this case, a timer may be operated on vehicle tx1. The value of the timer may be preconfigured.

In step S2850, vehicle tx1 may transmit broadcast traffic to vehicle rx4, together with a reference synchronization source change indication. Alternatively, in step S2851, vehicle tx1 may transmit a reference synchronization source change indication to vehicle rx4. The reference synchronization source change indication may be a control message or control data.

The reference synchronization source change indication may include a timing difference (e.g., a symbol offset (To)) between the new reference synchronization source and the existing reference synchronization source measured after vehicle tx1 acquires the synchronization from vehicle tx2. Further, the reference synchronization source change indication may include information (e.g., ID) about vehicle tx2 that becomes the new reference synchronization source. Further, the reference synchronization source change indication may include information about a reference synchronization source activation time that informs when vehicle tx1 applies the timing of the new reference synchronization source. Further, the reference synchronization source change indication may include the SL-SSID of the SL-SS transmitted by the new reference synchronization source, vehicle tx2.

In step S2860, vehicle rx4 configures an FFT boundary based on the current reference synchronization source and the received symbol offset (To). Vehicle rx4 may continue to receive the broadcast services from vehicle tx1 within that FFT boundary.

In step S2870, if the timer has expired, vehicle tx1 locks the reference synchronization source to vehicle tx2.

In step S2880, vehicle tx1 provides the broadcast services to vehicle rx4 from the reference synchronization source activation time.

According to the second implementation of the present disclosure, broadcast services can be provided continuously after a reference synchronization source change without disconnection.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
   establishing, by a first device, connection between the first device and a second device;
   receiving, from the second device, a first Sidelink Synchronization Signal Block (SL-SSB);
   performing synchronization with the second device based on the first SL-SSB;
   receiving, from the second device, sidelink services using the second device as a reference synchronization source;
   receiving, from the second device, information about a change of the reference synchronization source; and
   changing the reference synchronization source from the second device to a third device after a period of time,
   wherein the information about the change of the reference synchronization source comprises a timing offset before and after the change of the reference synchronization source, and
   wherein a Fast Fourier Transform (FFT) boundary is configured based on a timing with the second device as the reference synchronization source and the timing offset.

2. The method of claim 1, wherein broadcast services are provided from the second device within the FFT boundary.

3. The method of claim 1, wherein the information about the change of the reference synchronization source comprises information about a reference synchronization source activation time informing when the change of the reference synchronization source takes effect,
   wherein the reference synchronization source activation time corresponds to the period of time.

4. The method of claim 1, wherein the information about the change of reference synchronization source comprises information about the third device.

5. The method of claim 1, wherein the information about the change of the reference synchronization source is transmitted from the second device, based on the second device receiving a second SL-SSB from the third device having a higher priority of the reference synchronization source than the second device.

6. The method of claim 5, wherein the information about the change of the reference synchronization source comprises an Identifier (ID) of the second SL-SSB.

7. The method of claim 1, wherein the timing offset comprises at least one of a System Frame Number (SFN) offset, a slot offset, a symbol offset, and/or a sample offset.

8. The method of claim 1, wherein the timing offset is expressed in sample units.

9. The method of claim 1, wherein the timing offset is a timing offset of SFN 0 or slot index 0.

10. A first device comprising:
at least one transceiver;
at least one processor; and
at least one memory operably connectable to the at least one processor and storing instructions that, based on being executed, cause the first device perform operations comprising:
establishing, by a first device, connection between the first device and a second device;
receiving, from the second device, a first Sidelink Synchronization Signal Block (SL-SSB);
performing synchronization with the second device based on the first SL-SSB;
receiving, from the second device, sidelink services using the second device as a reference synchronization source;
receiving, from the second device, information about a change of the reference synchronization source; and
changing the reference synchronization source from the second device to a third device after a period of time,
wherein the information about the change of the reference synchronization source comprises a timing offset before and after the change of the reference synchronization source, and
wherein a Fast Fourier Transform (FFT) boundary is configured based on a timing with the second device as the reference synchronization source and the timing offset.

* * * * *